US007608468B1

(12) United States Patent  
Ghinovker et al.

(10) Patent No.: US 7,608,468 B1
(45) Date of Patent: Oct. 27, 2009

(54) APPARATUS AND METHODS FOR DETERMINING OVERLAY AND USES OF SAME

(75) Inventors: Mark Ghinovker, Migdal Ha'Emek (IL); Michael E. Adel, Zichron Ya'akov (IL); Jorge Poplawski, Haifa (IL); Joel L. Seligson, D.N. Misgav (IL)

(73) Assignee: KLA-Tencor Technologies, Corp., Milpitas, CA (US)

( * ) Notice: Subject to any disclaimer, the term of this patent is extended or adjusted under 35 U.S.C. 154(b) by 137 days.

(21) Appl. No.: 10/950,172

(22) Filed: Sep. 23, 2004

Related U.S. Application Data

(63) Continuation-in-part of application No. 10/858,836, filed on Jun. 1, 2004, now Pat. No. 7,346,878.

(60) Provisional application No. 60/484,627, filed on Jul. 2, 2003, provisional application No. 60/506,281, filed on Sep. 26, 2003, provisional application No. 60/546,546, filed on Feb. 20, 2004.

(51) Int. Cl.
| | |
|---|---|
| G01R 31/26 | (2006.01) |
| H01L 21/00 | (2006.01) |
| G01B 11/00 | (2006.01) |
| G01B 11/14 | (2006.01) |
| G01B 5/02 | (2006.01) |
| G01D 18/00 | (2006.01) |

(52) U.S. Cl. .................. 438/16; 438/462; 356/401; 356/620; 702/86; 702/172

(58) Field of Classification Search ............. 438/14, 438/16, 460, 462; 356/401, 620; 430/22, 430/30; 702/86
See application file for complete search history.

(56) References Cited

U.S. PATENT DOCUMENTS

| | | | |
|---|---|---|---|
| 4,251,160 A | 2/1981 | Bouwhuis et al. | |
| 4,475,811 A | 10/1984 | Brunner | |
| 4,538,105 A | 8/1985 | Ausschnitt | |
| 4,703,434 A | 10/1987 | Brunner | |
| 4,714,874 A | 12/1987 | Morris et al. | |

FOREIGN PATENT DOCUMENTS

EP     0 818 814     1/1998

(Continued)

OTHER PUBLICATIONS

Ghinovker, et al., "Overlay Marks, Methods of Overlay Mark Design and Methods of Overlay Measurements", U.S. Appl. No. 09/894,987, filed Jun. 27, 2001.

(Continued)

*Primary Examiner*—Walter L Lindsay, Jr.
*Assistant Examiner*—Ron E Pompey
(74) *Attorney, Agent, or Firm*—Weaver Austin Villeneuve & Sampson LLP

(57) ABSTRACT

Disclosed are techniques and apparatus are provided for determining overlay error or pattern placement error (PPE) across the field of a scanner which is used to pattern a sample, such as a semiconductor wafer or device. This determination is performed in-line on the product wafer or device. That is, the targets on which overlay or PPE measurements are performed are provided on the product wafer or device itself. The targets are either distributed across the field by placing the targets within the active area or by distributing the targets along the streets (the strips or scribe areas) which are between the dies of a field. The resulting overlay or PPE that is obtained from targets distributed across the field may then be used in a number of ways to improve the fabrication process for producing the sample. For instance, the resulting overlay or PPE may be used to more accurately predict device performance and yield, more accurately correct a deviating photolithography scanning tool, or determine wafer lot disposition.

23 Claims, 13 Drawing Sheets

U.S. PATENT DOCUMENTS

| | | | |
|---|---|---|---|
| 4,757,207 | A | 7/1988 | Chappelow et al. |
| 4,757,707 | A | 7/1988 | Harvey et al. |
| 4,778,275 | A | 10/1988 | van den Brink et al. |
| 4,782,288 | A | 11/1988 | Vento |
| 4,820,055 | A | 4/1989 | Müller |
| 4,855,253 | A | 8/1989 | Weber |
| 4,929,083 | A | 5/1990 | Brunner |
| 5,017,514 | A | 5/1991 | Nishimoto |
| 5,100,237 | A | 3/1992 | Wittekoek et al. |
| 5,112,129 | A | 5/1992 | Davidson et al. |
| 5,148,214 | A | 9/1992 | Ohta et al. |
| 5,156,982 | A | 10/1992 | Nagoya |
| 5,172,190 | A | 12/1992 | Kaiser |
| 5,216,257 | A | 6/1993 | Brueck et al. |
| 5,262,258 | A | 11/1993 | Yanagisawa |
| 5,296,917 | A | 3/1994 | Kusonose et al. |
| 5,383,136 | A | 1/1995 | Cresswell et al. |
| 5,414,514 | A | 5/1995 | Smith et al. |
| 5,436,097 | A | 7/1995 | Norishima et al. |
| 5,438,413 | A | 8/1995 | Mazor et al. |
| 5,477,057 | A | 12/1995 | Angeley et al. |
| 5,479,270 | A | 12/1995 | Taylor |
| 5,481,362 | A | 1/1996 | Van Den Brink et al. |
| 5,498,501 | A | 3/1996 | Shimoda et al. |
| 5,596,413 | A | 1/1997 | Stanton et al. |
| 5,604,819 | A | 2/1997 | Barnard |
| 5,617,340 | A | 4/1997 | Cresswell et al. |
| 5,627,083 | A | 5/1997 | Tounai |
| 5,665,495 | A | 9/1997 | Hwang |
| 5,674,650 | A | 10/1997 | Dirksen et al. |
| 5,699,282 | A | 12/1997 | Allen et al. |
| 5,701,013 | A | 12/1997 | Hsia et al. |
| 5,702,567 | A | 12/1997 | Mitsui et al. |
| 5,703,685 | A | 12/1997 | Senda et al. |
| 5,712,707 | A | 1/1998 | Ausschnitt et al. |
| 5,757,507 | A | 5/1998 | Ausschnitt et al. |
| 5,766,809 | A | 6/1998 | Bae |
| 5,783,342 | A | 7/1998 | Yamashita et al. |
| 5,805,290 | A | 9/1998 | Ausschnitt et al. |
| 5,835,196 | A | 11/1998 | Jackson |
| 5,857,258 | A | 1/1999 | Penzes et al. |
| 5,863,680 | A | 1/1999 | Kawakubo et al. |
| 5,872,042 | A | 2/1999 | Hsu et al. |
| 5,877,036 | A | 3/1999 | Kawai |
| 5,877,861 | A | 3/1999 | Ausschnitt et al. |
| 5,902,703 | A | 5/1999 | Leroux et al. |
| 5,912,983 | A | 6/1999 | Hiratsuka |
| 5,923,041 | A | 7/1999 | Cresswell et al. |
| 5,939,226 | A | 8/1999 | Tomimatu |
| 5,949,145 | A | 9/1999 | Komuro |
| 5,952,134 | A * | 9/1999 | Hwang .................. 430/22 |
| 5,960,125 | A | 9/1999 | Michael et al. |
| 5,968,693 | A | 10/1999 | Adams |
| 6,020,966 | A | 2/2000 | Ausschnitt et al. |
| 6,023,338 | A | 2/2000 | Bareket |
| 6,037,671 | A | 3/2000 | Kepler et al. |
| 6,061,606 | A | 5/2000 | Ross .................. 700/121 |
| 6,077,756 | A | 6/2000 | Lin et al. |
| 6,079,256 | A | 6/2000 | Bareket |
| 6,084,679 | A | 7/2000 | Steffan et al. |
| 6,118,185 | A | 9/2000 | Chen et al. |
| 6,128,089 | A | 10/2000 | Ausschnitt et al. |
| 6,130,750 | A | 10/2000 | Ausschnitt et al. |
| 6,137,578 | A | 10/2000 | Ausschnitt |
| 6,140,217 | A | 10/2000 | Jones et al. |
| 6,146,910 | A | 11/2000 | Cresswell et al. |
| 6,160,622 | A | 12/2000 | Dirksen et al. |
| 6,165,656 | A | 12/2000 | Tomimatu |
| 6,384,899 | B1 | 5/2002 | den Boef |
| 6,405,096 | B1 | 6/2002 | Toprac et al. |
| 6,462,818 | B1 | 10/2002 | Bareket |
| 6,612,159 | B1 | 9/2003 | Knutrud |
| 6,664,121 | B2 * | 12/2003 | Grodnensky et al. .......... 438/16 |
| 6,675,053 | B2 | 1/2004 | Baluswamy et al. |
| 6,734,549 | B2 | 5/2004 | Takeoka et al. |
| 6,734,971 | B2 * | 5/2004 | Smith et al. .................. 356/401 |
| 6,753,120 | B2 * | 6/2004 | Kim .......................... 430/30 |
| 6,921,916 | B2 | 7/2005 | Adel et al. |
| 6,985,618 | B2 | 1/2006 | Adel et al. |
| 7,068,833 | B1 | 6/2006 | Ghinovker et al. |
| 2001/0055720 | A1 | 12/2001 | Sato et al. |
| 2003/0021465 | A1 | 1/2003 | Adel et al. |
| 2003/0021466 | A1 | 1/2003 | Adel et al. |
| 2003/0021467 | A1 | 1/2003 | Adel et al. |
| 2003/0026471 | A1 | 2/2003 | Adel et al. .................. 382/144 |
| 2003/0102440 | A1 * | 6/2003 | Sohn ....................... 250/491.1 |
| 2005/0173634 | A1 * | 8/2005 | Wong et al. ................. 250/311 |
| 2006/0039595 | A1 | 2/2006 | Adel et al. |
| 2006/0177120 | A1 | 8/2006 | Ghinovker et al. |
| 2006/0204073 | A1 | 9/2006 | Ghinovker et al. |

FOREIGN PATENT DOCUMENTS

| | | |
|---|---|---|
| EP | 0 947 828 | 10/1999 |
| JP | 11-067631 | 3/1999 |

OTHER PUBLICATIONS

Adel, et al., "Overlay Metrology and Control Method", U.S. Appl. No. 10/367,124, filed Feb. 13, 2003.

Claims from U.S. Appl. No. 10/858,836, filed Jun. 1, 2004.

U.S. Office Action mailed Oct. 10, 2006, from related U.S. Appl. No. 10/950,172.

Bishop, et al, *The OMAG3 Reticle Set,* Jul. 31, 2003, International Sematech, Technology Transfer #3074417A-ENG, pp. 1-26.

Dirksen, et al., "Novel aberration monitor for optical lithography", Part of the SPIE Conference on Optical Microlithography XII, Santa Clara, CA Mar. 1999, SPIE vol. 3676, p. 77-86.

Farrar et al., "In-situ measurement of lens aberrations", Mar. 2000 Proceedings of SPIE Vo. 4000, Optical Microlithography XIII.

Levinson et al., "Minimization of Total Overlay Errors on Product Wafers Using an Advanced Optimization Scheme", SPIE vol. 3051 (1997) p. 362-373.

Normura, "Measurement of Wave-Front Aberrations in Lithography Lenses with an Overlay Inspection Tool", Optical Review No. 8, vol. 4 (2001) p. 227-234.

Levinson, "Lithography Process Control", Tutorial Texts in Optical Engineering, vol. TT28, Chapter 5, pp. 96-107.

Rivera et al., "Overlay Performance on Tungsten CMP Layers Using the Athena Alignment System".

Hsu et al., "Characterizing lens distortion to overlay accuracy by using fine measurement pattern", Mar. 1999, SPIE vol. 3677.

U.S. Appl. No. 10/367,124, filed Feb. 13, 2003; Office Action mailed Apr. 23, 2007.

U.S. Appl. No. 10/367,124, filed Feb. 13, 2003; Office Action mailed Oct. 4, 2007.

Notice of Allowance mailed Sep. 5, 2007, from related U.S. Appl. No. 10/858,836.

US 5,841,144, 11/1998, Cresswell (withdrawn)

* cited by examiner

APPARATUS AND METHODS FOR DETERMINING OVERLAY AND USES OF SAME

CROSS REFERENCE TO RELATED PATENT APPLICATION

This is a continuation-in-part of U.S. patent application Ser. No. 10/858,836, filed Jun. 1, 2004 now U.S. Pat. No. 7,346,878 by Avi Cohen, et al., which application claims priority of U.S. Provisional Application No. 60/484,627, filed Jul. 2, 2003 by Avi Cohen, et al., which applications are incorporated herein by reference in their entirety for all purposes.

This application also claims priority of U.S. Provisional Patent Application No. 60/506,281 filed 26 Sep. 2003 by Michael E. Adel, et al. and U.S. Provisional Patent Application No. 60/546,546 filed 20 Feb. 2004 by Michael E. Adel, et al. which applications are incorporated herein by reference in their entirety for all purposes.

BACKGROUND OF THE INVENTION

The present invention relates generally to the field of semiconductor overlay metrology. More specifically, it relates to techniques for calibrating overlay measurements obtained from a product wafer or device.

Typically, defects are detected within special test structures or targets, rather than the active device or die itself. By way of example, various targets are designed to measure misalignment or overlay errors between two adjacent layers. Other targets are designed for other purposes, such as measurement of critical dimension or detection of electrical faults or killer defects. There are numerous types of targets on which characteristics may be measured or which may be inspected for defects, e.g., by comparing to an ideal reference target to the target under inspection.

Although these targets are used to estimate yield or defect density within the active area, the targets are typically relegated to special test areas of the field (e.g., the four outer corners of the field perimeter or scribe line). That is, the targets are not located within the same area as the functioning or active device. Conventional positioning of targets outside the active areas allows one to dedicate product space to product features. It has been undesirable to utilize active area space for nonfunctioning structures because engineers are constantly striving to maximize active feature density.

Unfortunately, a test structure positioned in the four corners of the exposure tool field or the scribe line does not best represent product function or typical variations across the field of the lithography (or exposure) tool. Multiple dies are exposed in a single field of the lithography tool. Although the scribe lines may extend across the wafer, these scribe lines may not extend across the field. Accordingly, defects captured or measured within the targets may not be a good indicator of defects within the product area or die itself. In a specific case, the lithography tool usually contains aberrations in its lens system which result in feature misalignments or pattern placement errors across the field. Even if a test structure is placed in each field (such as in the center of each die), a manufacturing process may be different for different areas of the product area, as opposed to the test area. For instance, the process may vary with position of the feature in the field. By way of specific example, product feature may be located at a different position of the field than the target feature areas and, accordingly, print differently than the target feature areas. Thus, deviations or defects which depend on feature field position are not captured by placing targets in special test areas because the targets do not correspond to a position within the field which is representative of the product feature.

Accordingly, it would be desirable to have targets which more reliably and accurately represent defects within the active or product region. Additionally, targets which capture deviations across the lithography field are desired.

SUMMARY OF THE INVENTION

Accordingly, apparatus and methods are provided for determining overlay error or pattern placement error (PPE) across the field of a lithography tool which is used to pattern a sample, such as a semiconductor wafer or device. This determination is performed in-line on the product wafer or device. That is, the targets on which overlay or PPE measurements are performed are provided on the product wafer or device itself. The targets are either distributed across the field by placing the targets within the active area or by distributing the targets along the streets (the strips or scribe areas) which are between the dies of a field. The resulting overlay or PPE that is obtained from targets distributed across the field may then be used in a number of ways to improve the fabrication process for producing the sample. For instance, the resulting overlay or PPE may be used to more accurately predict device performance and yield, more accurately correct a deviating photolithography scanning tool, or determine wafer lot disposition.

In a specific embodiment, a method of determining a characteristic of a plurality of targets is disclosed. A plurality of targets are provided on a product specimen having a plurality of active devices. In one aspect, the product specimen is a semiconductor wafer having a plurality of die. At least some of the targets are distributed across a field of a lithography tool which was used to fabricate the product specimen, and the number of targets is such that the targets can be used to determine a nonlinear dependence of a characteristic of the targets as a function of field position. The characteristic of the targets which are distributed across the field is measured. The measured characteristic is then used to monitor or adjust a process for fabricating the product specimen.

In one implementation, the measured characteristic comprises overlay information and using the overlay information includes at least determining a nonlinear field dependence based on the overlay information measured from the distributed targets as a function of field position. In a further aspect, using the measured overlay further comprises using the nonlinear function to determine a disposition of a plurality of product specimens which are being fabricated together. In a specific implementation, the targets include four corner targets placed at four corners of the field, as well as the targets distributed across the field, and the method further comprising measuring overlay on the four corner targets. In this implementation, the nonlinear function is further based on the overlay of the four corner targets. A linear function of the overlay of the four corner targets as a function of field position may also be determined and used as correctables for the lithography tool.

In another use aspect, using the measured overlay includes using only the linear terms of the nonlinear function as correctables for the lithography tool. In another embodiment, using the measured overlay further includes using the nonlinear function as correctables for the lithography tool. In yet another embodiment, using the measured overlay further comprises using the nonlinear function to monitor the lithography tool. In each of these use examples, the targets may also include four corner targets placed at four corners of the field and targets distributed across the field, and the method further comprises measuring overlay on the four corner targets. The nonlinear function may then be further based on the overlay of the four corner targets. A linear function may also be determined based on the overlay of the four corner targets and used as correctables for the lithography tool.

In a specific implementation, the targets distributed across the field are positioned within one or more street(s) that are between die of the product specimen. In another implementation, the targets distributed across the field are integrated within one or more die of the product specimen.

In another aspect, the invention pertains to an inspection system operable to determine a characteristic of a plurality of targets. A plurality of targets are provided on a product specimen having a plurality of active devices. In one aspect, the product specimen is a semiconductor wafer having a plurality of die. At least some of the targets are distributed across a field of a lithography tool which was used to fabricate the product specimen, and the number of targets is such that the targets can be used to determine a nonlinear dependence of a characteristic of the targets as a function of field position. The characteristic of the targets which are distributed across the field is measured. The inspection system includes one or more processors and one or more memory configured to perform one or more of the above method operations. In a specific implementation the computer system forms a metrology system for measuring overlay in samples. In yet another aspect, the invention pertains to a computer program product for determining a characteristic of a plurality of targets. The computer program product includes at least one computer readable medium and computer program instructions stored within the at least one computer readable product configured to perform one or more of the above described inventive procedures.

These and other features and advantages of the present invention will be presented in more detail in the following specification of the invention and the accompanying figures which illustrate by way of example the principles of the invention.

DETAILED DESCRIPTION OF SPECIFIC EMBODIMENTS

Reference will now be made in detail to a specific embodiment of the invention. An example of this embodiment is illustrated in the accompanying drawings. While the invention will be described in conjunction with this specific embodiment, it will be understood that it is not intended to limit the invention to one embodiment. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Introduction

Figure 1:
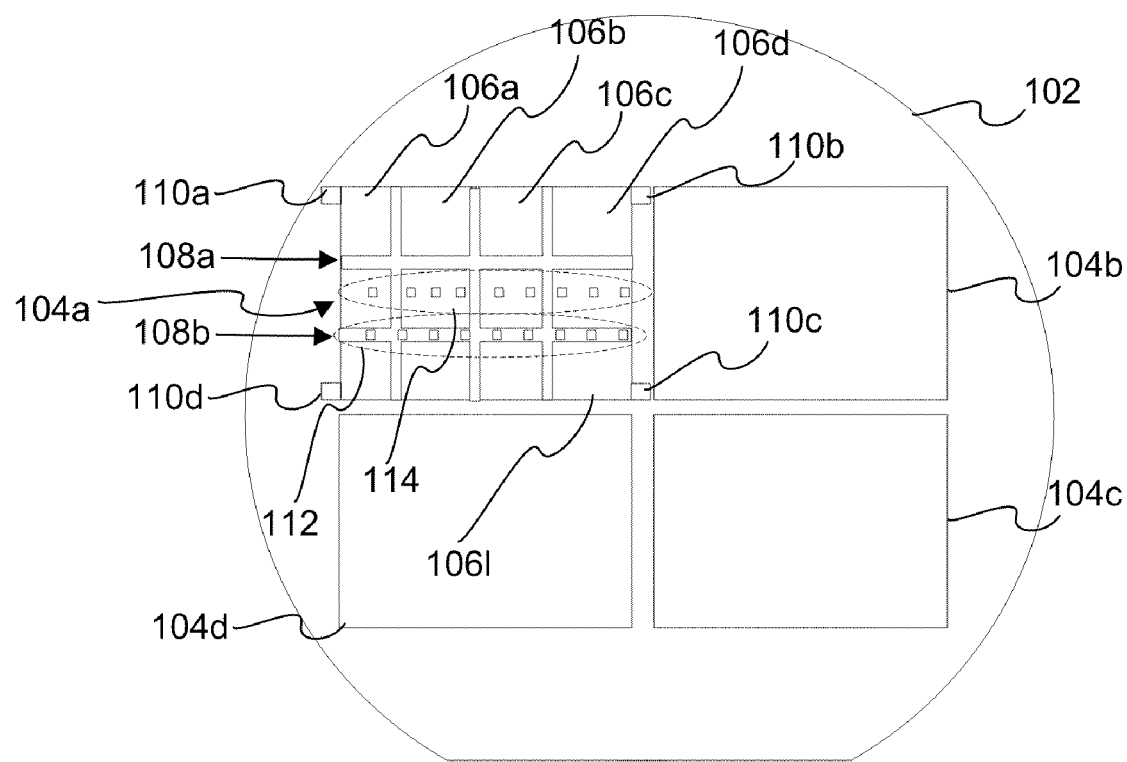
FIG. 1 is a diagrammatic top view of a wafer having a plurality of field areas across which targets are distributed in accordance with one embodiment of the present invention.

FIG. 1 is a diagrammatic top view of a wafer 102 having a plurality of field areas 104 across which targets are distributed in accordance with one embodiment of the present invention. Each field generally corresponds to a field of a lithography tool which is used to pattern the various portions of the die and target structures as explained further below. Each field may include one or more die. As shown, field 104a includes die 106a through 106l. The die are separated by streets 108. For example, street 108a separates a first row of die from a second row of die. Likewise, street 108b separates the second row of die from a third row of die. Although only four fields are shown on a single wafer in the illustration of FIG. 1, of course, any suitable number of fields may be present on each wafer.

Likewise, any suitable number of die may be present in a single field.

In the present invention, targets are distributed across at least one field of the product wafer. This distribution may be accomplished by either distributing the targets along a street which runs across the field or within the dies themselves. As shown, a set of targets 112 are distributed along street 108b. Of course, targets may be distributed along any number of streets and the number of targets depends on the desired accuracy of the overlay or PPE measurements as weighed against other factors, such as target measurement throughput and complexity, as well as available space. Alternatively or additionally, targets may be integrated within dies which are themselves distributed across the field. As shown, a set of targets 114 are integrated within dies which are positioned between street 108a and 108b. Several embodiments of targets which are integrated within the dies are described in U.S. Provisional Application No. 60/484,627, filed 2 Jul. 2003, entitled APPARATUS AND METHODS FOR PROVIDING IN-CHIP MICROTARGETS FOR METROLOGY OR INSPECTION, by Avi Cohen et al., which application is incorporated herein by reference in its entirety.

In one implementation, the targets which are distributed across the field are designed to correlate to actual device behavior. That is, overlay targets which are device representing will have a same overlay error or pattern placement error (PPE) as actual devices. In this example, conventional targets which are process robust are also utilized. Unlike device representing targets, process robust targets are stable with small variations in the photolithography or manufacturing process. In the illustrated example, a process robust target 110 is placed in each corner of each field 104, while the device representing targets 114 or 112 are distributed across the field. As further described below, the process robust targets may be used to obtain a linear overlay correction for the lithography tool which is used to form the wafer 102, while the device representing targets which are distributed across the field may be used to provide more accurate overlay or PPE as a function of field position. Both sets of targets (process robust and device representing) may be used together for either the linear lithography correction or to provide a more accurate overlay or PPE. Several uses for both types of targets are further described below.

Overlay Determination and Use Embodiments

Figure 2A:
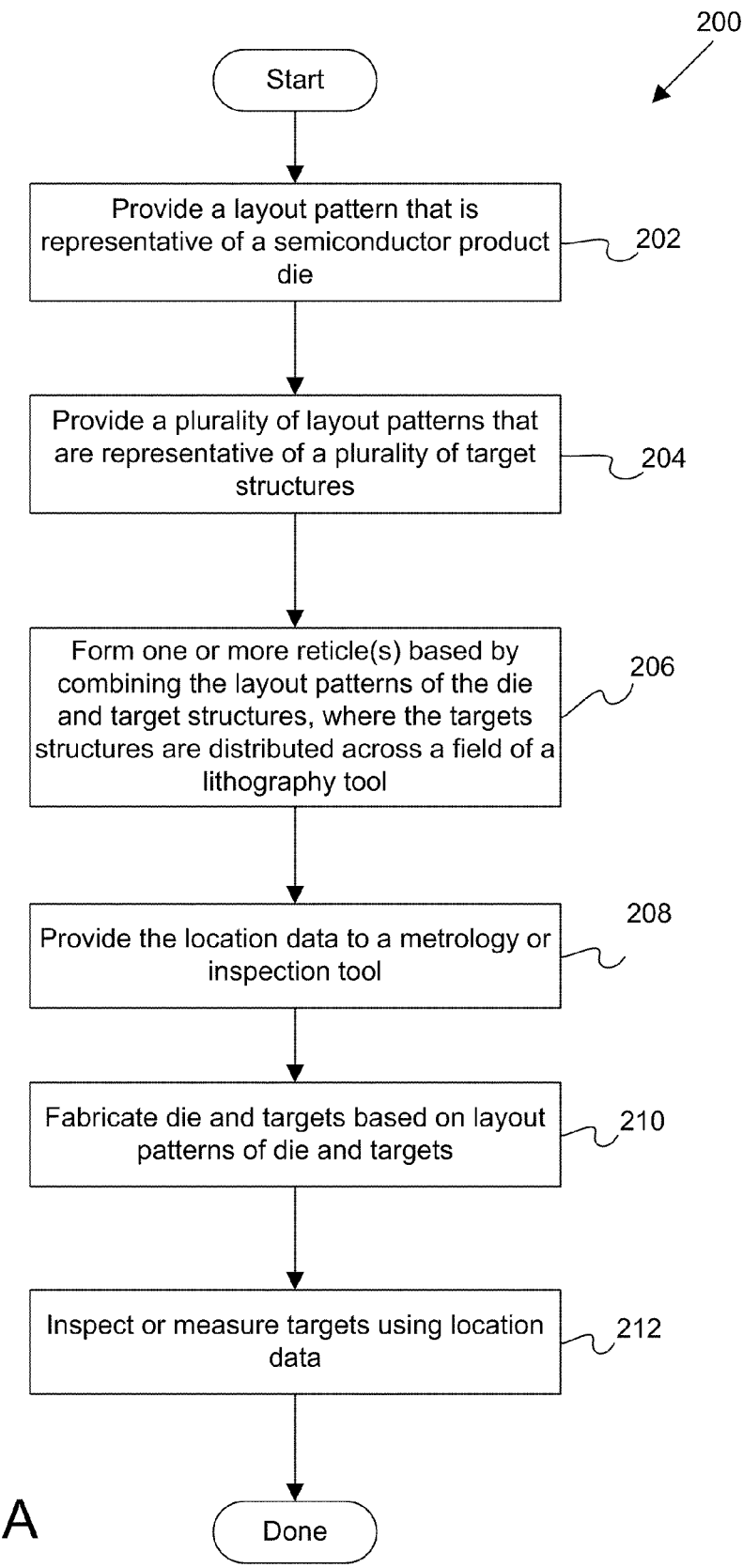
FIG. 2A is a flowchart illustrating a procedure for forming a plurality of die and targets in accordance with one embodiment of the present invention.

FIG. 2A is a flowchart illustrating a procedure 200 for forming a plurality of die and targets in accordance with one embodiment of the present invention. Initially, a layout pattern that is representative of a semiconductor product die is provided in operation 202. A plurality of layout patterns that are representative of a plurality of target structures is then also provided in operation 204.

An integrated circuit (IC) device and target structure may be designed using any suitable design techniques. For example, an IC designer may use preexisting schematic library blocks to form the IC device and targets using, for example, electronic design automation (EDA) tools. In some cases, the IC designer may create an entire IC device target or part of an IC device or target from scratch with the aid of any suitable design system, such as conventional computer aided design (CAD) tools. For example, the IC designer may use a schematic CAD tool to plan the logic diagrams for a particular IC device or target. Still further, the IC designer may write a description of the IC device or target or portions of the IC device or target with the aid of a hardware design language, such as VHDL.

The IC designer then typically generates a layout pattern from the IC circuit design. The layout pattern may be composed of a plurality of electronic representations of IC layers that are later converted into a plurality of reticles that are used to fabricate a plurality of physical layers of an IC device and target. Each physical layer of the fabricated IC device corresponds to one of the reticles and an associated one of the electronic representations from the layout pattern. For example, one electronic representation may correspond to a diffusion pattern on a silicon substrate, another to a gate oxide pattern, another to a gate polysilicon pattern, another to a contact pattern on an interlayer dielectric, another to a line pattern on a metallization layer, and so on. The targets may be formed from any combination of one or more layers. For example, a special layer may be reserved for the target structures, or the targets may be formed from the dummy layer. Each electronic representation is composed of a plurality of polygons or other shapes (herein, referred to as "figures"), which together define the layout or reticle pattern.

The layout pattern may be generated using any suitable technique, for example, by using EDA or CAD tools. For example, the IC designer may manually lay out the layout patterns for the IC device and targets with or without preexisting library cells. Alternatively, a synthesis tool may automatically create layout patterns for the IC device and targets from scratch or by piecing together preexisting library cells based on the schematic design.

One or more reticles are then formed based on combining the layout patterns of the die and target structures in operation 206. In one or more of the reticles, the target structures are distributed across a field of a lithography or scanner tool in operation 206. Referring back to FIG. 1, a plurality of targets 112 are distributed within a street 108b so as to be distributed across field 104a. Preferably, the targets are placed within a street which runs through the center of the field. Alternatively, a plurality of target structures 114 may be distributed within the die areas themselves.

The reticles are produced using the layout patterns. Each reticle corresponds to one or more electronic representation(s) from the circuit pattern database. The reticles may be produced by any suitable pattern generator or reticle writer equipment, such as a MEBES" 4500, commercially available from ETEC of Hayward, Calif.

The location data for each target structure may be provided to a metrology or inspection tool in operation 208. This information transfer may occur at any point within the process flow prior to one or more inspection or metrology stage(s). The location of a particular target may be stored in any suitable format for identifying a position of the particular target. For example, the location may take the form of Cartesian or polar coordinates. The identity is generally used to distinguish between different types of targets. It may take the form of alphanumeric text which identifies the type of target, such as overlay, CD, etc., or the identity may take the form of a reference to a target image.

The location data may be provided directly or indirectly through another entity, such as a database or controller. That is, the location data may be output by the CAD module and input or uploaded into a particular inspection or metrology tool. Alternatively, the location data may be stored within the fabrication database which is accessible by the various process, inspection, review, and metrology tools. The location data may be stored in a format that is readable or accessible by a particular inspection, review, or metrology tool. For example, the location data may be in OpenAccess format, which is readable by inspection and metrology tools from KLA-Tencor.

The die and targets are then fabricated based on the formed reticle in operation 210, and the targets may then be measured or inspected using the location data in operation 212. The targets may be inspected at any one or more times within the fabrication process.

Any suitable inspection, review, or metrology tool may be utilized during any stage of the fabrication. Each tool may take the form of an optical system, such as a bright field or dark field optical system. The tool may also utilize both bright field and dark field modes. Examples of bright field systems include the 2350, 2351, 2360, and 2370 from KLA-Tencor, Corp. of San Jose, Calif. Examples of dark field system include the AIT II, AIT XP, Fusion, Fusion UV, and SP1 PatternPro available from KLA-Tencor, Corp. of San Jose, Calif. The KLA 301 or 351 Reticle Inspection Tool may be used to inspect reticles. Each tool may also take the form of an electron beam (ebeam) system, such as a scanning, snapshot, or step-and-repeat type ebeam system. Examples of ebeam systems include the eV300 and eS20XP available from KLA Tencor, Corp. of San Jose, Calif. A tool may be designed to detect special types of defects, such as macro defects across a large area of the sample, defects on a bare substrate, or defects within solder bums (e.g., ball grid array bumps). Each tool may also be stand alone or integrated within a processing tool.

Figure 2B:
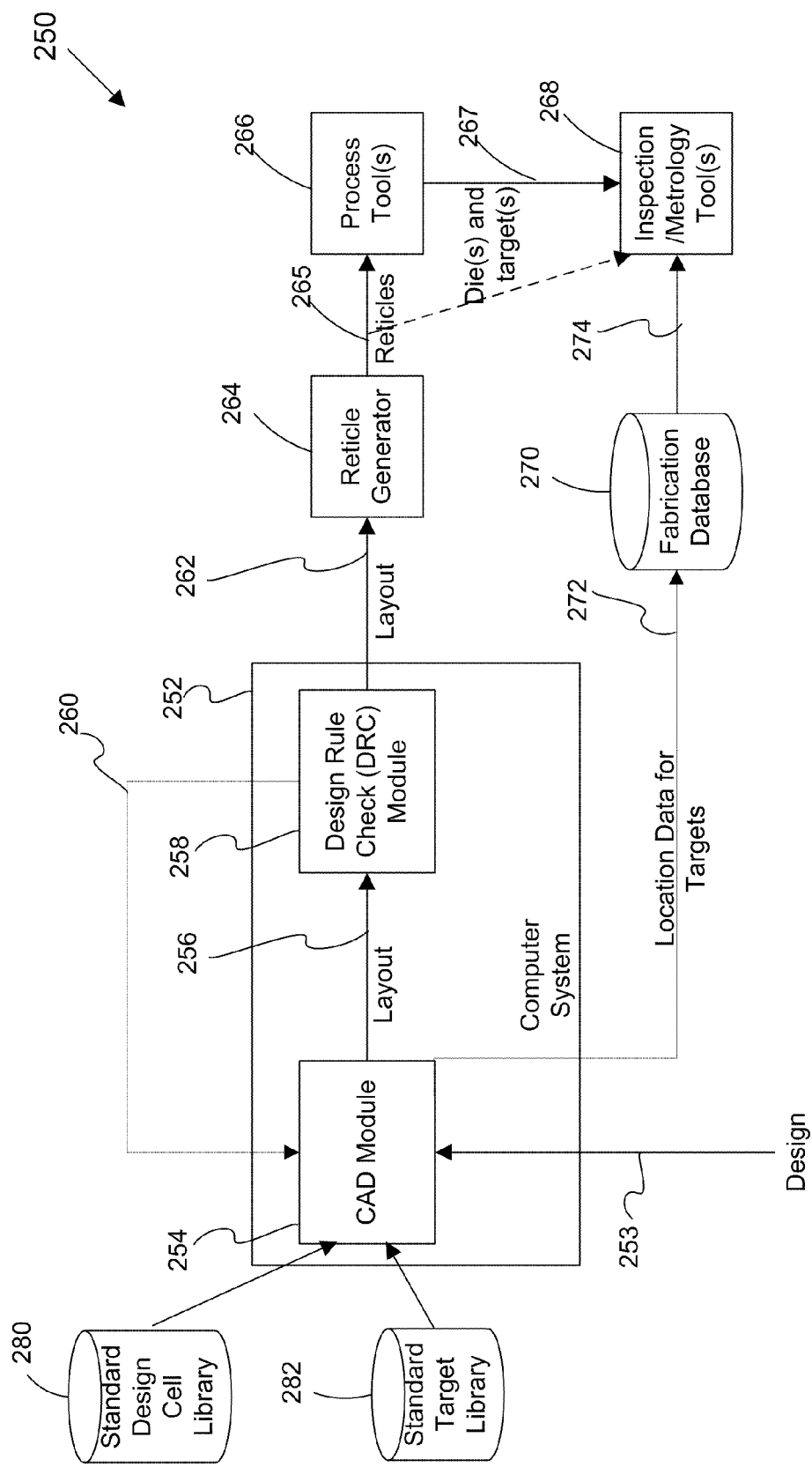
FIG. 2B is a diagrammatic representation of a design, fabrication, and metrology or inspection system in accordance with one embodiment of the present invention.

FIG. 2B is a diagrammatic representation of a design, fabrication, and metrology or inspection system 250 in accordance with one embodiment of the present invention. As shown, a design 253 of a die and targets is input into a computer aided design (CAD) module 254. This CAD module 254 may also have access to one or more databases containing standard layout patterns. In the illustrated embodiment, a standard design cell library 280 includes layout patterns for features within the active regions of the die and a standard target library 282 includes a number of different standard target layout patterns.

The CAD module 254 is generally configured to generate a layout pattern either automatically or via input from a design engineer. Several suitable CAD products for designing IC products are available from Cadence of San Jose, Calif. and Mentor Graphics of Wilsonville, Oreg. The layout pattern 256 is then checked by a design rule check (DRC) module 258. The DRC module is generally configured to determine whether the layout 256 conforms to a set of layout constraints. A feedback pathway 260 is provided to CAD module 254 for modification of the layout pattern 256 when the layout pattern fails to conform to the DRC. For example, the DRC module may indicate a number of nonconforming layout regions which may the be modified to comply with the design rules. As shown, the CAD module and DRC module are contained within the same computer system 252. Of course, the CAD module and DRC module may be implemented in any suitable combination of hardware and software.

After the layout pattern is determined to conform to the design rules by the DRC module 258, the layout pattern 262 is passed to a reticle generator 264 in a form that is readable by the radical generator. For example, the layout may be in a GDSII format. The reticle generator then forms a plurality of reticles 265 based on the layout pattern 262. The reticles may then be used by one or more process tools 266 to at least partially fabricate one or more die(s) and integrated targets 267. With regards to forming the targets and die, the targets are generally patterned on the product wafer using suitable photolithographic techniques. In the simplest case, the targets are formed within a photoresist layer on the test wafer (e.g., resist/resist wafer). Alternatively, the targets may be formed in other layers such as dielectric or metal layers.

The resulting the die(s) and targets (e.g., formed on the product wafer) may then be provided to one or more inspections or metrology tools 268 so that the targets may be inspected or measured. Of course, the reticle targets 265 may also be inspected or measured. With regards to measuring the targets, the overlay measurements may be performed using a variety of methods and metrology tools. For example, they may be performed using imaging, scanning, scatterometry and the like. Thus, inspection or metrology results are obtained from targets which are distributed across the field.

Location data 272 for each target is also provided to the inspection or metrology tools 268 so that the targets may be found by the tool. In one specific embodiment, the location data is retained in fabrication database 270, which is accessible by the inspection or metrology tools 268. Alternatively, the location data may be directly provided or transferred to the inspection or metrology tools 268.

Figure 3:
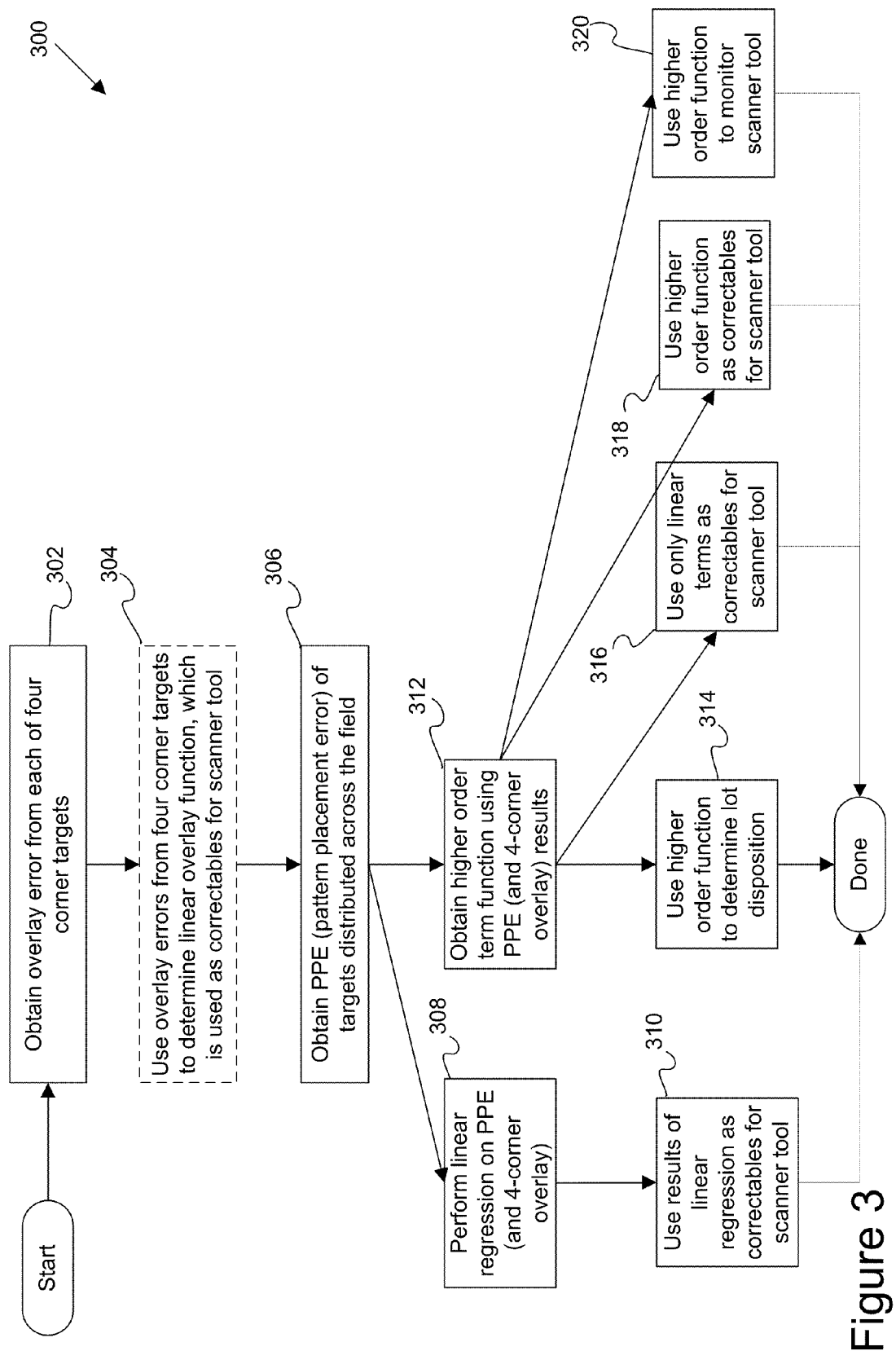
FIG. 3 is a flowchart illustrating specific uses of targets which are distributed across the field in accordance with one embodiment of the present invention.

FIG. 3 is a flowchart illustrating specific uses of targets which are distributed across the field in accordance with one embodiment of the present invention. Initially, an overlay error may be obtained from each of the four corner targets in operation 302. The overlay errors from the four corner targets may then be used to determine a linear overlay function, which is used as correctables for a scanner tool in operation 304.

The term "correctables" generally refers to data that may be used to correct the alignment of the lithography or scanner tool to improve the control of subsequent lithographic patterning with respect to overlay performance. In essence, the correctables allow the wafer process to proceed within desired limits, i.e., provides feedback and feed forward to get the tool better aligned.

In general, although four corner targets are described and illustrated, any suitable set of targets may be provided so as to obtain a linear overlay function for input into the scanner. Additionally, these targets are also stable under various lithography or process conditions so that the targets may be used as an absolute overlay anchor to which overlay measurements from device representing targets may be compared (as further described below). However, if the scanner is designed to receive nonlinear correctables, one may simply use a set of targets distributed across the field which provide a nonlinear overlay function as described in the following operations. In this latter implementation, the targets distributed across the field include process robust targets, as well as process related targets.

Referring back to the illustrated implementation of FIG. 3, overlay and/or pattern placement error (PPE) is then obtained from the targets distributed across the field in operation 306. An overlay error or PPE is typically obtained from a device structure formed during a lithographic process (or photolithographic process).

In brief, overlay error generally pertains to the determination of how accurately a first patterned layer aligns with respect to a second pattered layer disposed above or below it and to the determination of how accurately a first pattern aligns with respect to a second pattern disposed on the same layer. The overlay error is typically determined with an overlay target having structures formed on one or more layers of a workpiece (e.g., semiconductor wafer). The structures may be periodic or they may be based on the structures of the Box in Box and related targets. If the two layers or patterns are properly formed, then the structure on one layer or pattern tends to be aligned relative to the structure on the other layer or pattern. If the two layers or patterns are not properly formed, then the structure on one layer or pattern tends to be offset or misaligned relative to the structure on the other layer or pattern.

PPE generally refers to the differences in overlay between two or more targets located at two or more positions with respect to the field. In a simplified example, a relative difference may exist between the overlay error of a first target and the overlay error of a second target, i.e., the differences may be found and thereafter characterized relative to one another. The differences may be caused by a variety of factors including, but not limited to, aberrations in the lenses of the lithography system, distortions in the lenses of the lithography system, mechanical errors of the lithography system, errors on the reticle, and the like. The first and second locations may be widely varied. For example, the targets may be positioned almost anywhere inside and outside the field. In most cases, however, the first location corresponds to a process robust target (e.g., located at one of the four corners of the field) and the second location corresponds to a device representing structure (e.g., one of the targets distributed across field in one or more streets or dies).

A relationship may be formed between the targets including both process robust and device representing targets. In most cases, the relationship is between process robust and device representing targets, and more particularly process robust targets located in the scribeline (or four corners) and device representing targets located across the field. The relationship may be in the form of direct offsets at given locations in the field, by extrapolation at given points of the field, or based on a mathematical transformation of the overlay at a given points of the field based on a parameterization.

The determined overlay error (or PPE) may be used to improve the control of subsequent lithographic patterning and to determine whether the quality of the lithographic pattern meets specified requirements. The techniques for determining overlay described herein may be suitable for a wide variety of photolithography processes, as for example, photolithographic processes pertaining to semiconductor manufacturing, optical device manufacturing, micro-mechanical device manufacturing, magnetic recording data storage manufacturing and the like. Although the techniques described herein may be used in any of the above processes, the illustrated embodiment described herein is directed at semiconductor manufacturing. As such, in this embodiment, the device structures may correspond to vias, trenches, lines, and the like.

The obtained overlay and/or PPE results may then be used for various purposes to monitor and/or improve the manufacturing process. For instance, a linear regression may be performed on the overlay and/or PPE results (and optionally the four corner overlay error results) in operation 308. For example, the overlay as a function of translation, rotation, and magnification may be obtained from four corner overlay targets. The result of the linear regression may then be used as correctables for the scanner tool in operation 310.

In another use case, a higher order term function may be obtained using the PPE (and four corner overlay) results in operation 312. For example, overlay along the x-axis may have the following function: Ax+Bx² and vary parabolically. Alternatively, the model may be based on trigonometric terms. This higher order function may then be used to determine lot disposition in operation 314. A predetermined range of acceptance for the higher order terms of the nonlinear overlay functions may be determined. When the measured values of the higher order terms are outside the predetermined range of these terms, it may be determined that the lot is bad and has to be reworked (if possible). For example, the photoresist may be stripped, the lithography tool adjusted, and a new pattern of photoresist is then applied.

Alternatively, the higher order terms may be thrown away so that only the linear terms are used as correctables for the scanner tool in operation 316. In the above example, the "Bx²" term is thrown out and the "Ax" term is used for the correctable to adjust magnification of the scanner.

Figure 6:
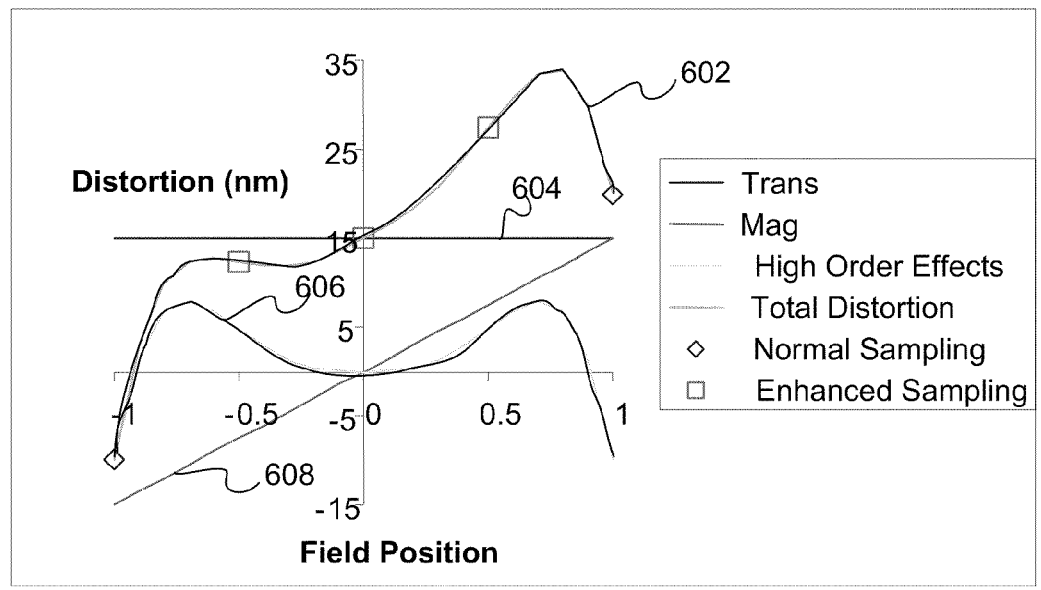
FIG. 6 is a graphical representation of normal sampling versus enhanced sampling results as a function of field position in accordance with one embodiment of the present invention.

FIG. 6 is a graphical representation of normal sampling versus enhanced sampling results as a function of field position in accordance with one embodiment of the present invention. The normal sample points are represented by two diamond shaped points, while the enhanced sampling is represented by multiple square shaped points. As shown, a nonlinear dependence curve 602 can be fit to the enhanced sampling points. A translation component 604 and a magnification component 606 may also be obtained from this nonlinear curve 602. These magnification and translation components may be used as correctables for the scanner tool. In contrast, the normal sampling points would result in a significantly more accurate correctables, e.g., as shown translation curve 608 as well as magnification (not shown).

In future scanner tools it may be possible to use non-linear correctables. Accordingly, the higher order function may be used as correctables for scanner tools which are configured to input higher order term correctables in operation 318. In the above example, the Ax+Bx² function may be utilized to correct the scanner.

The higher order function may also be used to monitor the scanner tool itself in operation 302. For example, a predetermined range of acceptable nonlinear functions may be determined. When the measured nonlinear function is not within the predetermined range of nonlinear functions, it may be determined that the lithography tool is out of specification and needs to be evaluated and adjusted. That is, a diagnostic test may be performed.

Any suitable technique may be used for determining overlay or PPE's dependency on position and resulting correctables. In a "2-layer PPE" approach, double layer segmented marks are placed in 4 corners of the field (or distributed across the field, as standard sampling requires). In addition, the same targets are distributed across the slit. In this example technique, stepper correctables are computed on the full set of the data from all of the targets. However, the model for correctables will include only terms, which will be corrected by (or input into) the scanner tool. Maximum predicted overlay (MPO) can also be computed on the full data set, but this in-field model will include terms, which fits the data in the best way. This technique is applicable for the layers where the target's OMF and process robustness are very high and scribe line space is a crucial.

In the 2-Layer PPE approach, the following steps may be performed although this procedure represents but one way of determining overlay and correctables based on such overlay:

Step1: Model selection. If the analysis is done for the first time, a wafer and field model is first selected. This model selection may be done as follows:

Step1.A A model, which describes field-by-field or wafer level variations (model1) in overlay, is selected in compliance with control knobs of the scanner/stepper. Model1 depends upon the particular requirements of the exposure tool.

Step1.B For the in-field variations, two field level models for overlay may be chosen. The first model (sub-model2) for overlay is a sub-model of the full model (model2):

$$ovl = \beta_0 + \sum_{i=1}^{P} \beta_i * x^i + \sum_{i=1}^{P} \alpha_i \cos(ix) + \sum_{i=1}^{P} \delta_i \sin(ix) + \qquad (3.1.1)$$

-continued
$$\sum_{i=1}^{p}\sum_{i=1}^{p}\eta_{ij}x^i*\sin(jx)+\sum_{i=1}^{p}\sum_{i=1}^{p}\varphi_{ij}x^i*\cos(jx)+f(y)$$

Where x is the coordinate across the slit, f(y) is the term which describes overlay perpendicular to the slit coordinates. This model may be used for MPE (Maximum Predicted Error) computations.

The terms of Sub-model2 may be selected based on any suitable criteria. For instance, over constraining of the data may be minimized and insignificant or noise terms thrown out. In one implementation, the terms of Sub-model2 are selected to achieve a maximum of adjusted $R^2$ (a measurement of goodness of fit) and a minimum of RMS or by other statistical criteria. Maximum adjusted $R^2$ may be determined by:

$$\text{Adjusted\_R}^2 = \left(R^2 - \frac{k-1}{n-1}\right)*\left(\frac{n-1}{n-k}\right)$$

Where k is total number of parameters in model; n is number of the measurements. Minimum RMS may determined by:

$$\text{RMS} = \frac{\sum_{i=1}^{n}(\text{residual}_i)^2}{n-k}$$

Where k is total number of parameters in model; n is number of the measurements

Step1.C The second model (model3) is selected in compliance with knobs of the scanner/stepper and will be used for scanner/stepper correction. For example, only the linear terms are selected for a scanner tool that has linear correctables.

Step 2: Computations of Correctables. The correctables may then be computed by MLE (Minimum Least Square) method by combining the models from Steps 1A and 1C and minimizing residuals from the fitted function to the measurements:

$$\min\Sigma(\text{ovl}_i - \text{modeled\_ovl}_i)^2 \quad (3.1.2)$$

Where $ovl_i$ is a measurement point (i), $modeled\_ovl_i$ is measurement point (i) predicted by wafer plus field models (from steps 1A and 1C). Equation 3.1.2 represents the criteria for determining which terms of the models to use. The results may be written in the form:

$$B=(X'X)^{-1}X'Ovl \quad (3.1.3)$$

Where B is vector of correctables, Ovl is a vector of measurements and X is matrix of coordinates, their powers and sines/cosines. The models are computed at this step are the model1 and the model3

Step 3: MPE computations. In order to compute MPE (maximum predicted error) or MPO, model parameters may be computed as described in step2. When minimization is done on model1 and sub-model2. Then MPE may be computed as:

$$\text{MPE}=\max(|XB\pm3*\text{stdev}|) \quad (3.1.4)$$

Where:

$$\text{stdev}^2=\sigma^2*X(X'X)^{-1}X' \quad (3.1.5) \text{ and}$$

$$\sigma^2 = \frac{\sum \text{residuals}^2}{n-m} \quad (3.1.6)$$

n is number of measurements, m is total number of model parameters.

In a "Simultaneous PPE" approach, double Layer non-segmented marks are placed in the 4 corners of the field (or distributed across the field, as standard sampling requires). Resist-resist and etch-etch simultaneous targets are then distributed across the slit. In general, stepper correctables may be computed by a cascade method. In the first stage, wafer correctables and in-field correctables may be computed on the double-layer data set (4 corners). Then in-field correctables can be computed on simultaneous sets separately for resist and etch or on differences between two layers. The final correctables may then be computed as sum of results. MPO can also be computed by a cascade method. In the first stage, wafer MPO can be computed on the double-layer data set (4 corners). Then using simultaneous sets and engineering models separately for resist and etch or on differences between two layers MPO's contribution of PPE can be computed. The final MPO can be computed as the sum of results. This technique is generally applicable for the layers where the target's Overlay Mark Fidelity and process robustness are very low for double-layer segmented targets.

In the Simultaneous PPE approach, the following steps may be performed although this procedure represents but one way of determining overlay and correctables based on such overlay:

Step1: Model selection. If the analysis is done for the first time, a wafer and field model is first selected. This model selection may be done in follow way:

Step1.A A model, which describes field-by-field or wafer level variations (model4) in overlay, is selected in compliance with knobs of the scanner/stepper. Model1 depends upon the particular requirements of the exposure tool.

Step1.B For the in-field variations, a first model (model5) is selected in compliance with knobs of the scanner/stepper for the two layer targets (e.g., non-segmented two layer four corner targets).

Step1.C For the in-field variations, a second model and a third model that describe PPE behavior of a current and a previous layer, respectively, across the field are also selected for the simultaneous layer targets (e.g., 1 layer targets distributed across the scribe line, slit, or dies). Both models (sub-model6.1 and sub-model6.2) are sub-models of the full model (model6):

$$ovl = \beta_0 + \sum_{i=1}^{p}\beta_i*x^i + \sum_{i=1}^{p}\alpha_i\cos(ix) + \sum_{i=1}^{p}\delta_i\sin(ix) + \quad (3.2.1)$$
$$\sum_{i=1}^{p}\sum_{i=1}^{p}\eta_{ij}x^i*\sin(jx)+\sum_{i=1}^{p}\sum_{i=1}^{p}\varphi_{ij}x^i*\cos(jx)+f(x)$$

Where x is coordinate across the slit and f(x) is the correctables which is defined in model5 Unlike the 2-layer PPE Approach outlined above, overlay in a particular direction, such as x, does not depend on the scanner movement in another direction, such as y, but only the scanner aberrations in a same direction, such as the x direction. Any suitable criteria may be used to select appropriate terms to be used from model6, such as Maximum of Adjusted $R^2$ and Minimum of RMS.

Step 2: Computations of Correctables. The correctables are computed in a cascade method.

Step 2.A At this step only data of standard sampling (4 corners) is used for the computations. The wafer and field correctables of model4 and model5 are combined by a MLE method. This MLE technique works if the values have a normal distribution. However, a different minimization algorithm may be used for non-normal distributions. The results are:

B4—wafer correctables; B5—field correctables.

Step 2.B The correctables of the model5, which are dependent in the across the slit coordinate, may then be computed using the data of the simultaneous targets from current and previous layers separately for each dataset. The method of minimization may be LMS (Least Maximum of Squares) or any other appropriate minimization algorithm such as MLE. The minimization technique chosen generally minimizes maximum-ordered squared residual or in the other words minimizes maximum residuals:

$$\min(\max_{i=1}^n (ovl_i - \text{modeled\_ovl}_i)^2) \quad (3.2.2)$$

An iterative algorithm may be used. The results are of optimization:

B5_Current and B5_Previous

Step 3.C The final field correctables may be computed as:

$$B5\_Final = B5 + B5\_Previous + B5\_Current \quad (3.2.3)$$

Step 4: MPO computations. The MPO computations may then be done in three steps

Step 4.A Predicted overlay (modeled_overlay_4_5) using model4 and model5 is computed.

Step 4.B Parameters of the model6.1 and model6.2 are computed by MLE methods (see 3.1.3) using the data sets of the previous and current layer. The results are:

B6.1—model parameters of the current layer; B6.2—model parameters of the previous layer Step 4.C Sigma of the prediction for each model is computed, as described in (3.1.5) and (3.1.6) and then total sigma is calculated:

$$\sigma_{total}^2 = \sigma_{model4\&model5}^2 + \sigma_{model6.1}^2 + \sigma_{model6.2}^2$$

Step 4.D MPO is then computed:

$$MPO = \max(|(B4*X + B5*X + B6.1*X + B6.2*X) + 3*\sigma_{total}^2|)$$

Example models for use in the above model selection operations may be found in "Modern Regression Methods" by Thomas Ryan or Matlab code, which is incorporated by reference in its entirety.

In the present invention, at least some of the targets on the product wafer are distributed across the field or across the slit of the scanner tool. In a specific example, the targets are distributed along a street which extends across such scanner slit. In an alternative implementation, the die and target patterns may be integrated together. Of course, targets may be distributed along one or more streets and integrated within one or more die so as to be distributed across the field.

Distributing targets along a field of the lithography tool allows a more accurate measurement of overlay or PPE as a function of field position which can be correlated to actual device position. Once a complex overlay and/or PPE function is obtained, the overlay and/or PPE may then be predicted for any position on the product wafer. Since the measurements are obtained in-line on the product wafer itself, overlay and/or PPE do not have to be obtained beforehand from test wafers under various process conditions. Additionally, a large database does not have be maintained for measurements from numerous test wafers in order to predict overlay, PPE, and yield on the product wafer.

When the targets are integrated within the die itself, several advantages may be achieved. As compared to targets placed in a street or scribe line or a special test area, the targets integrated within the die may be more reliably and accurately inspected or measured to determine whether there are any defects or whether a process is deviating out of specification, as compared with conventional targets placed within special test areas or within the scribe line. Since the targets are integrated within the die itself, the targets better represent the active region structures. For instance, the targets have a same feature density as the die features and will likely result in the same defects and process problems as the die features. Accordingly, the targets may be used to more accurately predict product yield (e.g., yield of the active structures).

Figure 4:
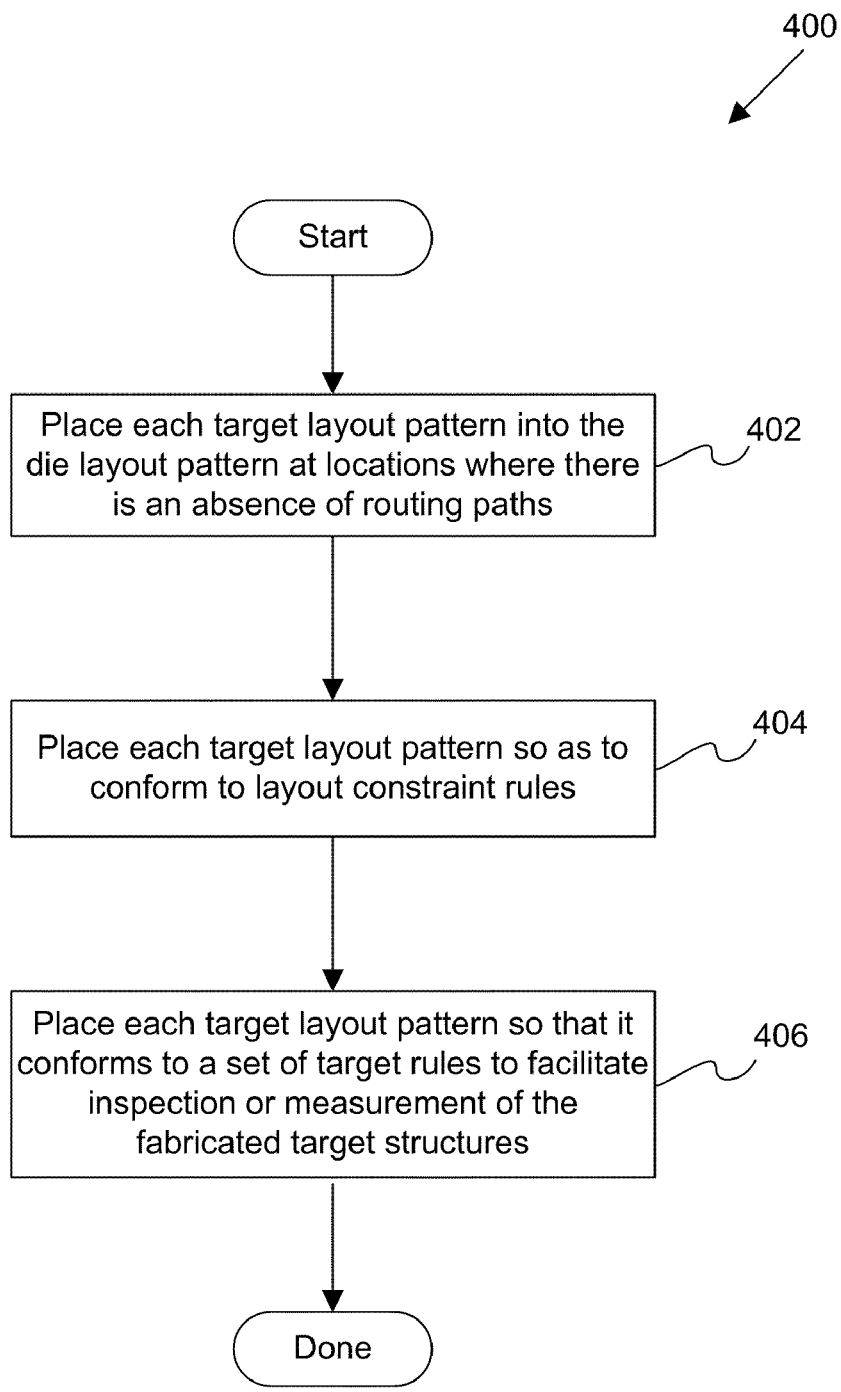
FIG. 4 is a flowchart illustrating a procedure of positioning target layout patterns along or integrated with the die layout patterns in accordance with one embodiment of the present invention.

The targets, whether they are positioned along one or more streets or within one or more die, are positioned based on a set of rules. FIG. 4 is a flowchart illustrating a procedure 400 of positioning target layout patterns along or integrated with the die layout patterns in accordance with one embodiment of the present invention. In general, the integrated die and target layout pattern may be accomplished based on a set of rules outlined in FIG. 4. Although the rules are outlined in a flowchart, one may comply with the rules as a whole, rather than sequentially one at a time, when placing the target layout patterns within the die layout pattern. Additionally, one may place the target layout patterns using any suitable combination of one or more of these rules, along as at least some of the targets are distributed across the field. The target patterns may be manually or automatically placed, e.g., by CAD module 154 of FIG. 2B, so as to conform to one or more rules. Targets may also be selected from a database of standard target layout patterns (e.g., 182 of FIG. 2B) which conform to one or more rules.

As shown in FIG. 4, each target layout pattern may be placed into the die layout pattern at locations where there is an absence of routing paths in operation 402. Of course, routing paths are not a consideration for targets which are placed within a street or scribe line. In this embodiment, the active regions are placed and routed prior to inserting the target layout patterns. The target layout patterns are inserted into open areas which do not contain routing paths or active region features. The targets may also be placed in empty areas in which dummy structures are typically placed. Dummy structures are typically placed in relatively large empty spaces.

Each target layout pattern may also be placed so as to conform to layout constraint rules in operation 404. Layout constraint rules generally include design rules which must be followed to likely achieve a functioning device given the current process parameters. These rules are especially relevant for design representing targets. For example, current processes cannot form a structure having a line width below a particular minimum line width. Accordingly, the layout constraints may include a minimum limit for line width. Other layout constraint examples are further described below.

Each target layout pattern is also placed so that it conforms to a set of target rules to facilitate inspection or measurement of the fabricated target structures in operation 406. The target may have to be formed with a particular size, shape, and orientation to allow inspection or characterization of the target. For instance, a metrology tool may not be able to measure a particular type of target's features that are smaller than a particular size. Thus, this particular target feature would have to have a size greater than the minimum required size. Further examples of target rules are outlined below.

The layout constraint rules may include any number and type of rules for likely achieving a functioning die or reducing defects. One noteworthy layout constraint is a limit on feature size and pitch. The reason for this constraint is that placement errors are typically dependent on feature size and density. For example, the target feature is sized (as well as the die feature) to conform with the minimum feature size and density constraints. In one implementation, the distance between each target and neighboring die or target feature may also be required to be greater than a predetermined minimum distance to comply with a feature density requirement. In one example, the distance between a die feature and an adjacent target feature is selected to be less than a predetermined minimum distance. Accordingly, the adjacent target is placed to meet this distance requirement. Density may also be specified in terms of feature area per total unit area, which is required to be less than a predetermined density value. Thus, a target feature may be sized and placed so that its area plus the area of one or more adjacent die or target features divided by the total area is less than the predetermined maximum density value.

Each target may also be sized and placed so as to fit within available spaces of the die layout pattern. Said in another way, each target is sized to fit within an available space within the die layout pattern while conforming to design rules. Standard targets which fit typical available spaces may be retained in a database for quick retrieval during placement of target patterns within a particular die pattern.

The target rules may include any number and type of rules for facilitating inspection, review, or metrology on the target structures. Particular target types are designed to detect defects or problems with one or more process or exposure tools. The targets are preferably placed so as to capture a maximum number of defects or problems without utilizing an unreasonable amount of die area for the targets. The selection of the number and density of the targets is referred to as a "sample plan." In one implementation, the sample plan includes a minimum spacing and a maximum spacing between targets of a same type.

Figure 5:
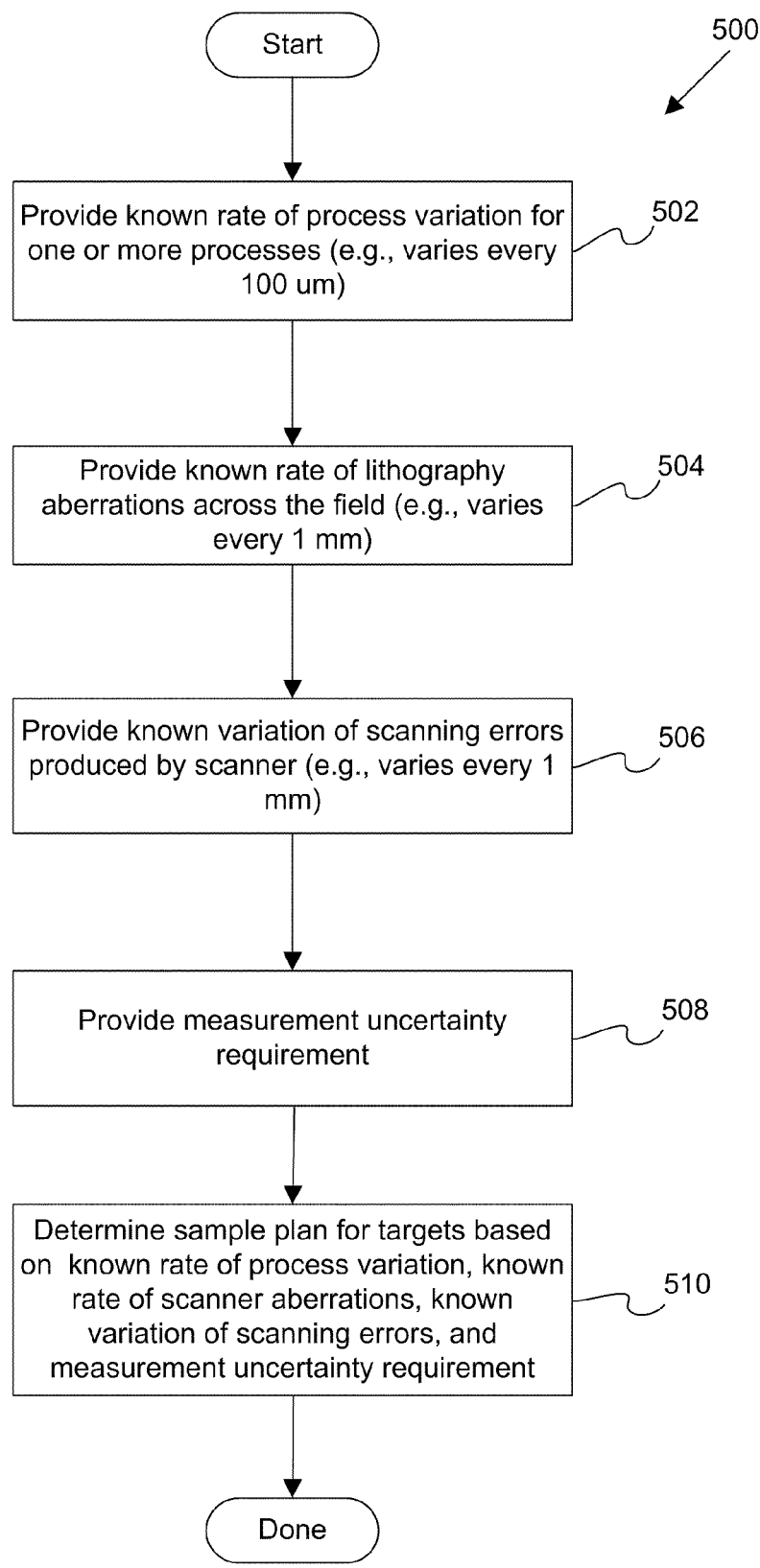
FIG. 5 is a flowchart illustrating a procedure for determining a sample plan in accordance with one embodiment of the present invention.

In the present invention, the targets are distributed across the scanner field so as to capture process variations. Thus, the sample plan may be based on any suitable type and number of known process variations. FIG. 5 is a flowchart illustrating a procedure 500 for determining a sample plan in accordance with one embodiment of the present invention. Initially, a known rate of process variation is provided for one or more processes in operation 502. For instance, the known rate of CMP (chemical mechanical polishing) may be quantified with a variation every 100 µm.

A known rate of aberrations across the field of a stepper or scanner type lithography tool is also provided in operation 504. For example, the aberrations may vary every 1 mm. In the case of a scanner type tool, aberrations may also be known to vary across the exposure slit. For instance, pattern placement error may vary across a length of a rectangular shaped slit due to variations in optics aberrations across the slit. Additionally, errors due to synchronization problems between movement of the scanner stage and movement of the slit may vary in a direction orthogonal to the scanner slit. A known variation of lithography errors produced by a lithography tool is also provided in operation 506. For instance, the scanning errors may be known to vary every 1 mm. A measurement uncertainty requirement (or mark fidelity) is also provided in operation 508.

A sample plan is then determined for the targets based on the provided known rate of process variation, known rate of lithography aberrations, known variation of scanning errors, and measurement uncertainty requirement in operation 510. For example, a minimum placement distance between targets may be selected as the minimum variation spacing of the process variations, lithography aberrations, and lithography errors. In the above examples of variations of 100 µm, 1 mm, and 1 mm, the spacing may be selected to be 100 µm. A spacing may be selected for both an x direction and a y direction (e.g., to accommodate variations in both the length and height of a scanner slit). In one example, targets are distributed with the selected spacing along both an x-axis street and along a y-axis street. A suitable number of targets may also be selected to result in a measurement uncertainty equal to or greater than the required measurement uncertainty.

Any suitable technique may be used to obtain known process or lithography error variations for a sample plan of a particular target type. For example, the lithography aberration variation across the field are usually provided with the lithography tool. One may use test reticles and quantify the variation in scanning errors across the reticle. Likewise, a number of test wafers may be fabricated to quantify the variation in process errors across the wafer or field. The measurement uncertainty requirement may be obtained by independently estimating the uncertainty contributions, such as precision, tool induced shift and mark fidelity.

Each target type may have a particular size, shape, and orientation which depends on the particular inspection, review, or metrology to be performed on such target. Any suitable number and type of targets may be integrated within a die layout pattern. The targets may include one or more of the following types: overlay, CD, film thickness, lithography focus or exposure, CMP polish uniformity or formed dishing and erosion, etc.

By way of example, rules may be developed for an overlay type target based on the types of measurements made on such a target type. Overlay type targets are used to measure misalignment between two different layers. Of course, misalignment may be measured between more than two layers, e.g., all the layers of the device. In a two layer example, each overlay target is formed from a first layer structure and a second subsequent layer structure. Additionally, the structures on the different layers of an overlay target would be designed to have a same center of symmetry. Thus, in a two layer target, the first layer target structures would have a same center of symmetry as the second layer target structures. Additionally, the target portions in the two different layers are preferably proximate to each other so that they may be measured together, e.g., within a single field. Although not required, the two different layer structures of each overlay target are preferably not on top of each other. In one implementation, the first layer structures are at a different rotational position with respect to the center of symmetry than the second layer structures. In another embodiment, the targets may be over the top of one another for Moiré or scatterometry measurements.

The target rules preferably include a requirement that the target be placed in a layer which is measurable or inspectable by a particular type of tool. For example, the target may have to be on a top layer or be covered with only optically transparent layers so that the target may be inspected by an optical tool. In other applications, the target may be required to be underneath an opaque layer so that the opaque layer's conformance to the underlying target may be inspected and/or measured. Additionally, each inspection, review, or metrology tool typically has a size constraint as to the measured or inspected structure. That is, structures below a particular size cannot be seen. Therefore, the targets must be sized so that they can be measured or inspected by the relevant tool.

Additionally, when targets are placed within one or more die, the die layout may be analyzed to determine whether particular portions or areas have a characteristic which negatively or positively affects metrology or inspection results, as compared with other areas of the die layout. For example, particular layout characteristics may result in more reliable or accurate metrology or inspection results. In one specific case, targets may be placed in areas which have characteristics that positively affect the metrology or inspection. In an example of such a feature characteristic, a chemical mechanical polishing (CMP) procedure is typically tuned to achieve superior accuracy with a particular feature density range. Thus, targets, such as overlay targets, may be placed in layout regions which are within the particular feature density range for an optimal CMP process.

Additionally, the circuit designer may be aware of feature locations in the die layout which are most susceptible to error or defects. The designer may communicate the position of such features to the target placement software or layout engineer so that targets may be placed proximate to such problem features. This placement technique would likely result in a higher incidence of defect capture and more reliable resulting products.

A further method of target layout placement could be with respect to modification of dummy structures to comply with specific metrology/inspection target design requirements. By way of example, if overlay was to be measured by scatterometry, then a layout rule could be implemented which requires that periodic dummy structures be placed above one another on subsequent layers. Furthermore, these dummy structures could be designed with specific offsets between them as disclosed in U.S. Provisional Applications: (1) Application No. 60/431,314 filed 5 Dec. 2002 by Walter Mieher et al., (2) Application No. 60/441,077 filed 17 Jan. 2003 by Walter Mieher, and (3) Application No. 60/440,970 filed 17 Jan. 2003 by Walter Mieher, which applications are herein incorporated by reference in their entirety. For example, adjacent areas could be designed to have equal but opposite offsets relative to the dummy structures on the underlying layer. Many other offset configurations could be implemented.

The techniques of the present invention may be implemented in any suitable combination of software and/or hardware system. Regardless of the system's configuration, it may employ one or more memories or memory modules configured to store data, program instructions for the general-purpose inspection operations and/or the inventive techniques described herein. The program instructions may control the operation of an operating system and/or one or more applications, for example. The memory or memories may also be configured to store layout patterns, layout constraint rules and target rules.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Target Embodiments

Whether the targets are placed within the active die areas, across one or more streets or the scanner slit, the targets may be formed in any suitable manner. In order to further enhance the overlay error and/or PPE obtained from the target structures, any one of the targets may correspond to process robust targets and/or device representing targets. Process robust targets generally refer to targets that can withstand a wide range of process conditions so that they can be measured with optimal performance under production conditions, i.e., the process has little effect on the process robust target measurement results. In essence, the process robust target is the target that gives the most consistent metrology results across the widest range of process conditions (e.g., CMP, Sputter, film thickness, exposure). Device representing targets, on the other hand, generally refer to targets that produce an overlay error similar to an actual device formed on a product wafer for a given set of process conditions. That is, device representing targets typically change in a similar manner as the device structure itself across the widest range of parameters (lens aberrations, focus, exposure, etc.). For example, if the device structure shifts 10 nm to the right then so does the device representing target. Several suitable process robust and device representative targets are described further in co-pending U.S. patent application Ser. No. 10/367,124, filed 13 Feb. 2003, entitled "OVERLAY METROLOGY AND CONTROL METHOD", by Michael E. Adel et al., which application is incorporated herein in its entirety.

Different variations of the process robust and device representing targets may be used. For example, the conventional four corner targets and the targets distributed across the field (e.g., in the streets or die) may include any suitable combination of process robust and/or design representative target structures. In one implementation, the four corner targets are process robust targets and the field distributed targets are design representative targets. In another implementation, at least one of the field distributed targets is a process robust target, while the others are design representative targets. A relationship may then be determined between the process robust target and each design representative target as it varies across the field. In particular, a first target corresponds to a process robust target and a second target corresponds to a device representing target. This is generally done to provide a better overlay determination. That is, since the process robust target is insensitive to unwanted variation, it tends to provide the most accurate and consistent overlay information in production, i.e., its not distorted by the process in unwanted ways. Furthermore, since the device representing target is more device representing, it tends to provide the most accurate overlay information with regards to how the process affects the actual device structure as it varies across the field.

In one embodiment of the invention, the first target corresponds to a process robust target, i.e., configured to withstand a wide range of process conditions so that it can be measured with optimal performance under production conditions, and the other targets correspond device representing targets, i.e., configured to produce an overlay error similar to an actual device. As should be appreciated, the device itself cannot be easily measured and thus a device representing target is used to mimic what is happening with the device at the location of the device in the field. By way of example, the device representing target may have spatial characteristics that are similar to the actual device (size, pitch, etc.), and may be located proximate the location of the actual device when formed on a product wafer.

The most process robust target is generally determined in a previous step. In one implementation, the most process robust target is determined by forming a plurality of process robust targets (e.g., tens to hundreds) across one or more wafers with various process conditions and with various known offsets to the overlay, and then measuring the process robust targets to see which targets are closest to a known overlay value. The targets closest to the known overlay value over the widest range of process conditions are considered the most process robust. The goal is generally to find a single process robust target for a given process, i.e., wafer layer, process conditions, tool, and the like.

The most device representing target is also generally determined in a previous step. In one implementation, the most device representing target is determined by printing a plurality of device representing targets across one or more wafers with various parameters; measuring the device representing targets; and comparing the measurements to the device itself over a wide range of conditions to see which device representing targets are closest to the ideal device structure, i.e., which device representing target stays faithful to the way that the device varies with parameters. The comparison may be widely varied. In most cases, the comparison is made using computational simulation (where physical process are modeled via sophisticated computer programs well known in the industry). Alternatively, scanning electron microscope (SEM), CD-SEM, Cross sectional SEM, atomic force microscope (AFM), high resolution profiler (HRP) techniques may be used to compare the two structures. The goal is generally to find a single device representing target for a given process, i.e., wafer layer, process conditions, tool, and the like.

The position, number and configuration of the targets may be widely varied. For example, the targets may be positioned almost anywhere on the product wafer. In general, at least some of the targets are distributed across the field of the lithography tool. As such, the overlay results from the distributed targets may be used to determine or extrapolate overlay for devices at particular positions in the field.

Further, the targets may be configured with similar attributes or they may be configured with substantially different attributes. For example, the targets may be from the same target family (substantially similar attributes) or they may be from a different target family (substantially different attributes). Even targets from the same target family may be configured differently, i.e., although they show similar attributes overall, they may have some attribute that differentiates it from its family member. By way of example, a first target family may contain process robust targets and a second target family may contain device representing targets.

In general, targets may be provided for two different overlay techniques, an imaging overlay procedure and a scatterometry or scanning electron microscopy (SEM) technique. Imaging overlay techniques are preferably performed on process robust type structures which tend to have stable structures under various process conditions. Additionally, the structures need to be large enough to image with imaging systems. In one implementation, non-segmented, two layer overlay targets are placed within the four corners of each field and PPE segmented, simultaneous targets are placed across the field. Each feature of the PPE has a same center of symmetry in at least a single direction (e.g., in the x or y direction).

Figure 7:
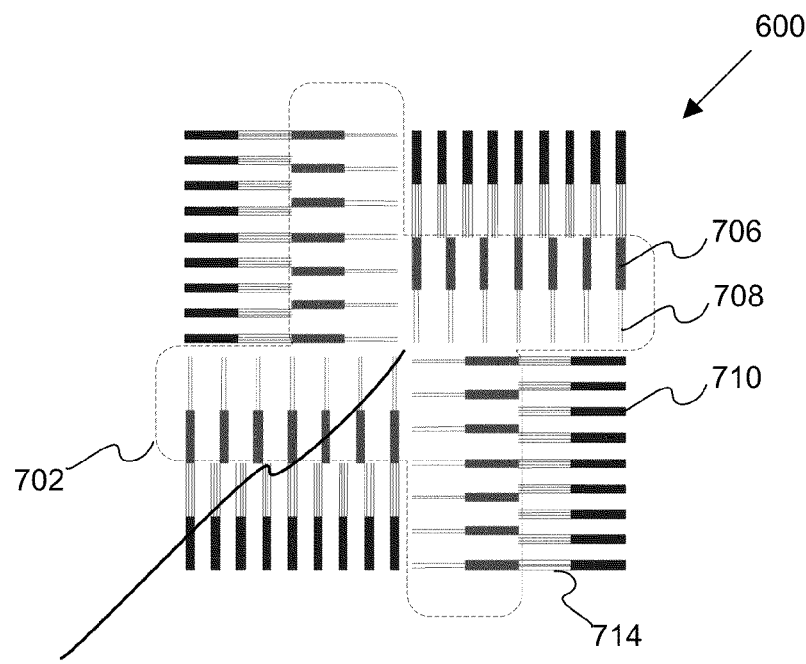
FIG. 7 is a top view diagrammatic representation of an overlay pattern in accordance with one embodiment of the present invention.

The imaging and scatterometry (or SEM) structures may also be combined into a single target or pattern. FIG. 7 is a top view diagrammatic representation of an overlay pattern 700 having device representing type and process robust type structures in accordance with one embodiment of the present invention. As shown, the pattern 700 includes structures on a first layer and structures on a second layer. The first layer structures are surrounded by a dashed line and labeled as 714 and the second layer structures 704 are the structures that are outside the dashed enclosure for the first layer structures 714. The first layer structures 702 are also referred to herein as inner structures 702, while the second layer structures 704 are referred to as outer structures 704.

In this implementation, each layer includes both process robust and non-segmented structures, such as first layer structures 706 and second layer structures 710. Each layer also includes design related, segmented structures, such as first layer structures 708 and second layer structures 714. The structures of each layer have a same center of symmetry as the other layer. In the illustrated example, the inner structures 702 have a same center of symmetry 716 as outer structures 704.

The structures of each layer may have any shape or distribution relative to each other so long as a corresponding set of structures of another layer has a same center of symmetry. Additionally, the structures of a first layer may have any distribution with respect to the structures of a second layer so that the first layer structures have a same center of symmetry in at least one direction as the second layer structures.

A combination target or pattern which contains both process robust and design related features may be positioned across the field in any number of ways. In one implementation, the combination pattern (e.g., 700) may be distributed along a street or scribe line or within the dies themselves across the field of the scanner tool. In this example, one may measure only the design related structures (e.g., the segmented structures of the first and second layers 712 and 714) to construct a nonlinear dependency of overlay with respect to field position using the techniques described above for determining overlay based on two layer patterns that are distributed across the field.

In another example, a combination target may be placed in each of the four corners of a field and distributed across the field, e.g., in the dies themselves or in the streets or scribe lines. In this example, the process robust structures of the first and second layers are used to determine a linear overlay dependency on position. The PPE between the first and second layer structures is then measured in each target distributed across the field and the measurement results are then used to construct a nonlinear model. If only one layer is distributed across the field, one may superimpose the single layer results onto the model derived from the two layer targets in the four corners using the simultaneous PPE techniques described above.

Large open areas on a semiconductor patterned wafer tend to cause dishing and/or erosion problems during a chemical mechanical polishing (CMP) process. Accordingly, the targets preferably have a uniform density to minimize these CMP effects and improve process robustness of the target.

Figure 8:
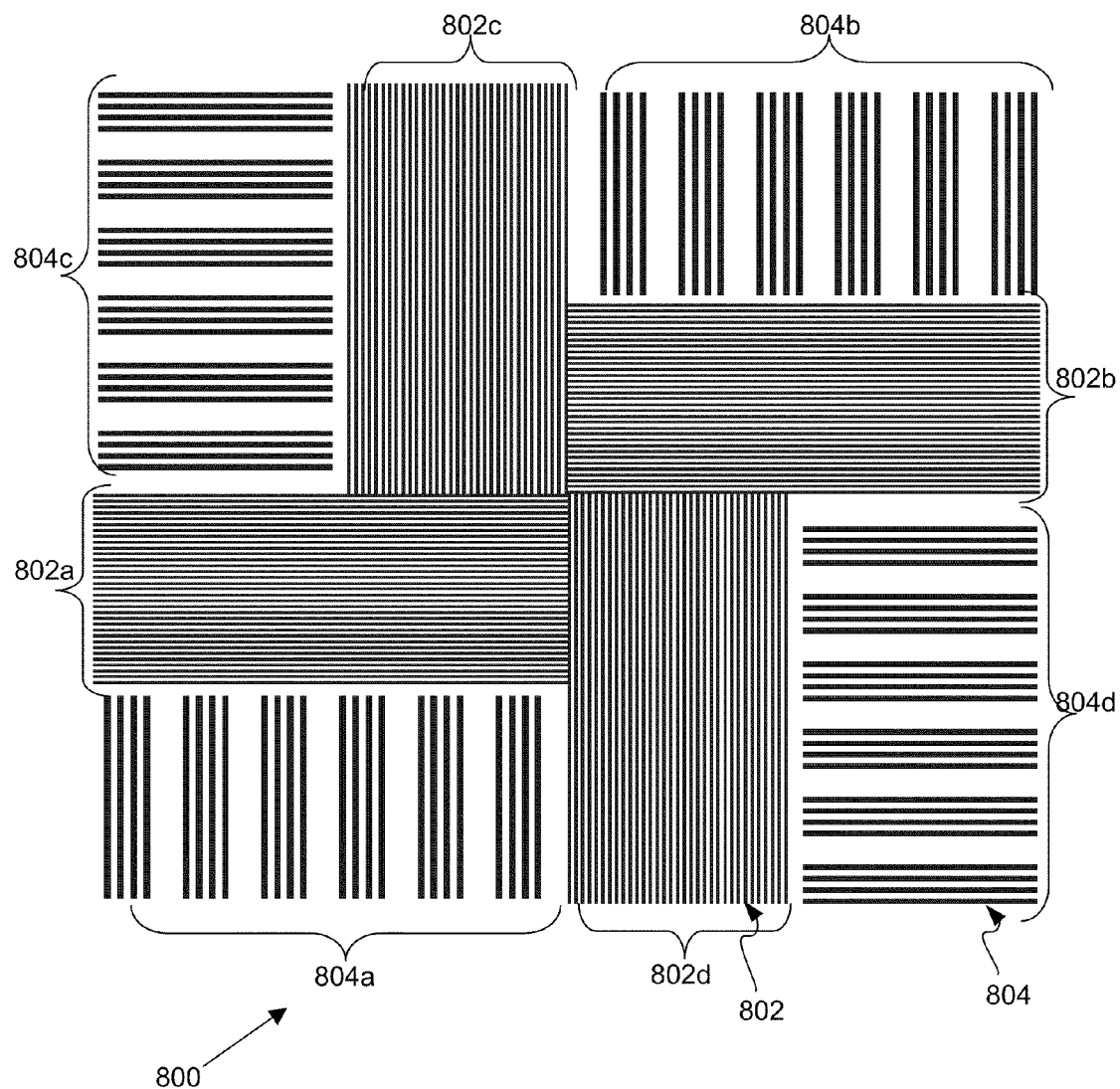
FIG. 8 is a top view diagrammatic representation of an overlay pattern in accordance with a second embodiment of the present invention.

FIG. 8 is an example first layer of a target 800 configured to improve process robustness in accordance with one embodiment of the present invention.

In this example, the first layer includes outer structures 804 to be used for the overlay measurement. The first layer also includes inner fill-in structures 802 that are not used for the overlay measurement, but to fill in otherwise empty spaces of the first layer so as to alleviate process effects, such as CMP effects. Alternatively, the measurement structures may be formed in the inner portion, while the fill-in structures are formed in the outer portion of the pattern layer. This target 800 may also include structures on a second layer (not shown). Overlay is determined by adding features in a second photoresist (or other) layer over the inner region structures and then determining the overlay between the features of the outer first layer and the features of the inner second layer.

The fill-in structures are preferably positioned orthogonal to the direction of measurement so as to not affect the measurement. In the illustrated embodiment, an optical signal in an x-direction perpendicular to the edges of some of the lines 804*a* and 804*b* of outer measurement structures. Thus, the edges of the lines 802*a* and 802*b* of fill-in inner structures which are adjacent to the x-direction measurement structures 804*a* and 804*b* are formed in a y direction. Likewise, y-direction measurement lines 804*c* and 804*d* of the outer measurement structures have corresponding x-direction fill-in lines 802*c* and 802*d* of the inner fill-in structures.

Figure 9:
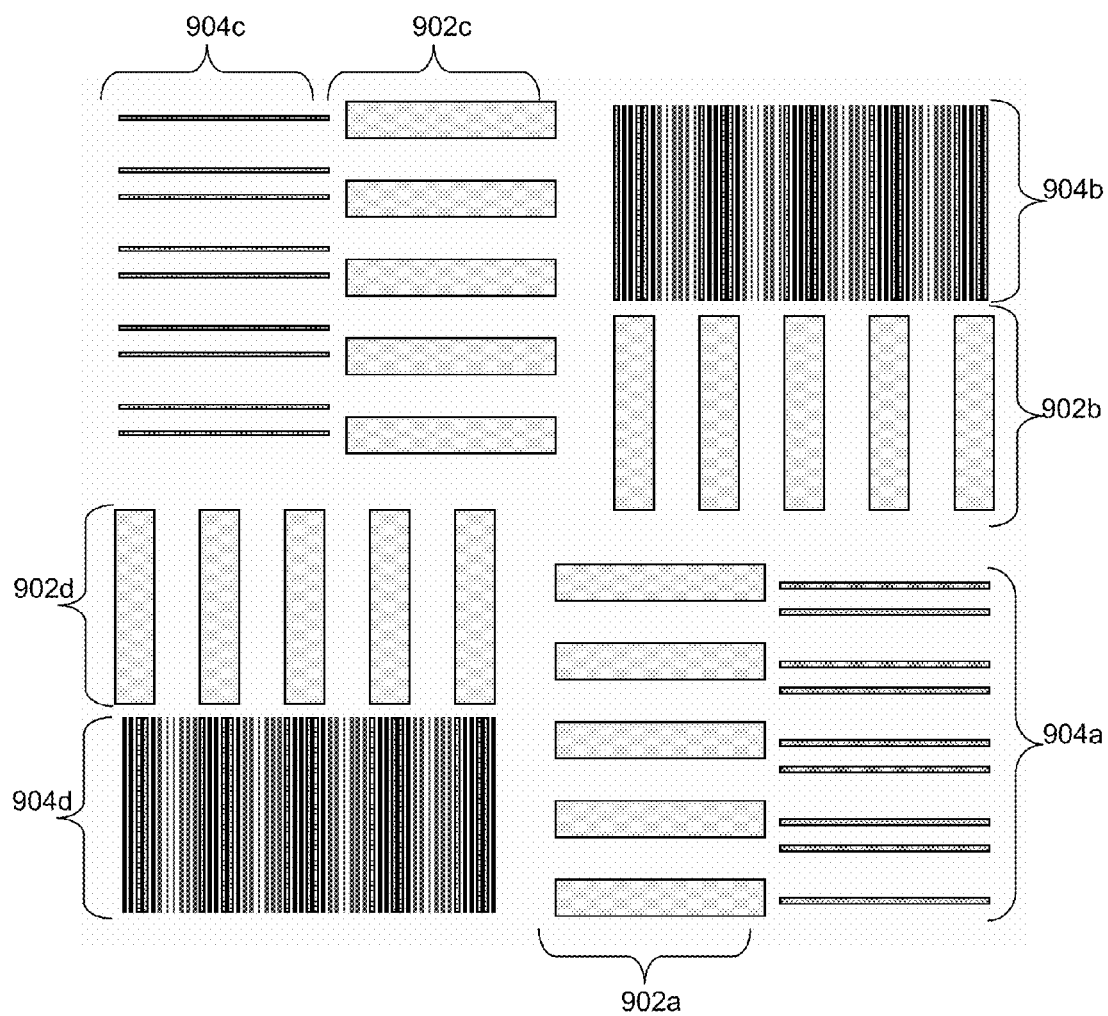
FIG. 9 is a top view diagrammatic representation of an overlay pattern in accordance with a third embodiment of the present invention.

In particular lithography systems, such as dipole lithographic illumination, printing is substantially better in a particular direction, such as x or y. FIG. 9 is an example target pattern, wherein the x and y direction structures differ significantly in accordance with one embodiment of the present invention. As shown, the inner structures 902 are process robust structures, while the outer structures 904 are design related structures. For dipole illumination, structures containing X and Y information will print entirely differently. In particular, when using dipole illumination, only one axis is typically important.

Dense, periodic structures which are stacked atop one another tend to have Moire effects during an optical measurement of the overlay between two layers of such a structure. For instance, if a first dense, periodic structure is fabricated on top of a second periodic structure that has a close to the same frequency, shifts between the two structures may cause a cancellation of the signals from particular portions of the structures due to deconstruction effects while causing an amplification of signals from other portions of the structures due to constructive effects.

One may use this Moire effect to create an apparent course pitch set of features from a fine pitch or design rule set of features. In one embodiment of the present invention, segmented, design rule features may be overlapped with other segmented features having design rule features to create a Moire effect, resulting in course pitch features which can then be measured to determine overlay between two different layers. Several embodiments of segmented, design rule features are further described in co-pending (1) U.S. application Ser. No. 10/185,737 (Publication No. 2003/0026471 A1), filed 6 Feb. 2003, entitled OVERLAY MARKS, METHODS OF OVERLAY MARK DESIGN AND METHODS OF OVERLAY MEASUREMENTS, by Michael Adel et al., and (2) U.S. application Ser. No. 09/894,987, filed 27 Jun. 2001, entitled OVERLAY MARKS, METHODS OF OVERLAY MARK DESIGN AND METHODS OF OVERLAY MEASUREMENTS, by Mark Ghinovker et al., which applications are incorporated herein by reference in their entirety for all purposes.

Techniques for using the Moire technique to create contrast at the metrology tool scale are further described, for example, U.S. Pat. No. 6,061,606, issued 9 May 2000, entitled GEOMETRIC PHASE ANALYSIS FOR MASK ALIGNMENT, by Ross, which patent is incorporated herein by reference in its entirety for all purposes. In one embodiment of the present invention, a group of Moire type features are assembled in a particular configuration relying on the Moire effect to create an apparent coarse pitch out of design rule features.

Figure 10:
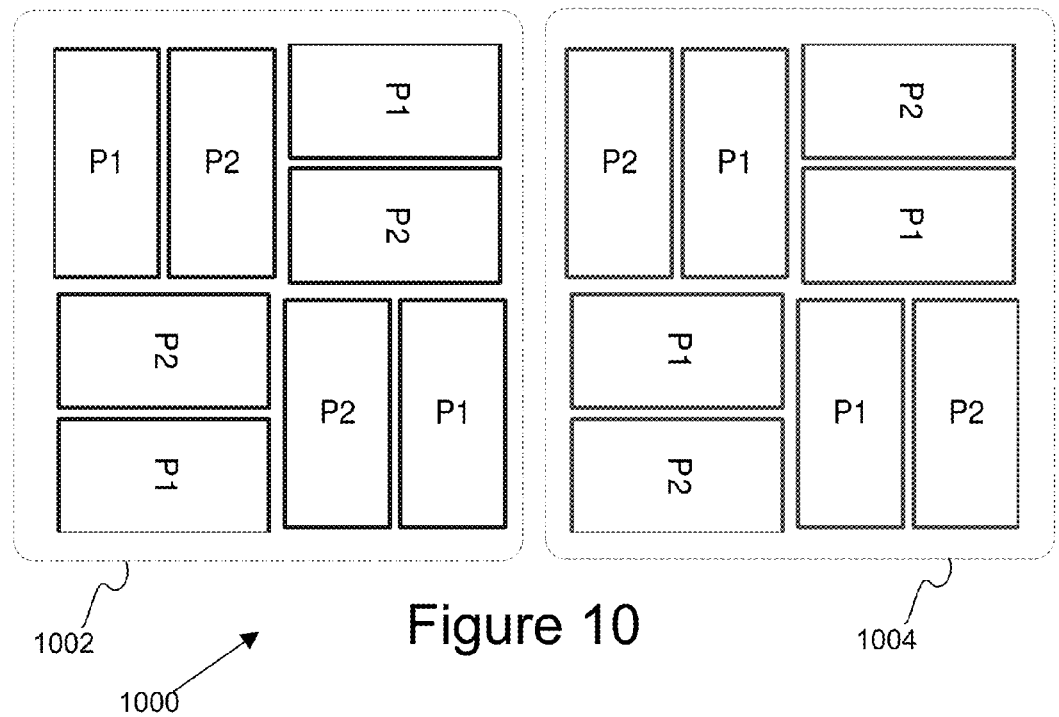
FIG. 10 is a top view diagrammatic representation of an overlay pattern in accordance with a fourth embodiment of the present invention.

FIG. 10 is a top view of each layer in a Moire type target 1000 in accordance with one embodiment of the present invention. As shown, the target 1000 includes a first layer 1002 and a second layer 1004. Each target layer may be divided into four quadrants with each quadrant having features of a first pitch P1 and features of a second pitch P2. Two of the quadrants contain features for measuring in a first direction, such as x, and two of the quadrants contain features for measuring in a second direction, such as y. When the layers are stacked, features having a first pitch P1 are stacked on features having a second pitch P2, and visa versa.

The particular geometric layout of the Moire pattern, shown in FIG. 10 has several advantages. This layout allows the maximization of the available field of view of the metrology tool and space on the mask. Also, the distribution of information in the field of view of the metrology tool is balanced and substantially cancels out the effect of metrology tool aberrations.

The pitches of the two overlayed feature sets of the first and second layer may be judicially selected so as to create multiple areas of light and dark contrast, instead of a single area, therefore improving the signal to noise and allowing the application of algorithms already disclosed in the above described U.S. application Ser. No. 10/185,737. Furthermore this configuration allows the application of these algorithms which leverage the "center of symmetry" techniques described in the current application.

By way of example pitch, P1 could be related to pitch P2 by the relationship $P1=(1+k)P2$, such that the effective pitch observed in the metrology tool is $P1/k$, where k is a dimensionless number significantly smaller than 1. By way of example, k could be 0.05. By overlaying a grating in layer 1 (1004 in FIG. 10) such that P1 is laid over P2 and P2 is laid over P1 in layer 2 ((1002 in FIG. 10)), overlay would be observed in a way similar to that observed using overlay metrology marks as disclosed in the above described U.S. application Ser. No. 10/185,737. There would be an effective amplification of the overlay shift by a factor of 1/k. This would have the added advantage of having both pitch areas at optimal focus in the same focal plane.

Figure 11:
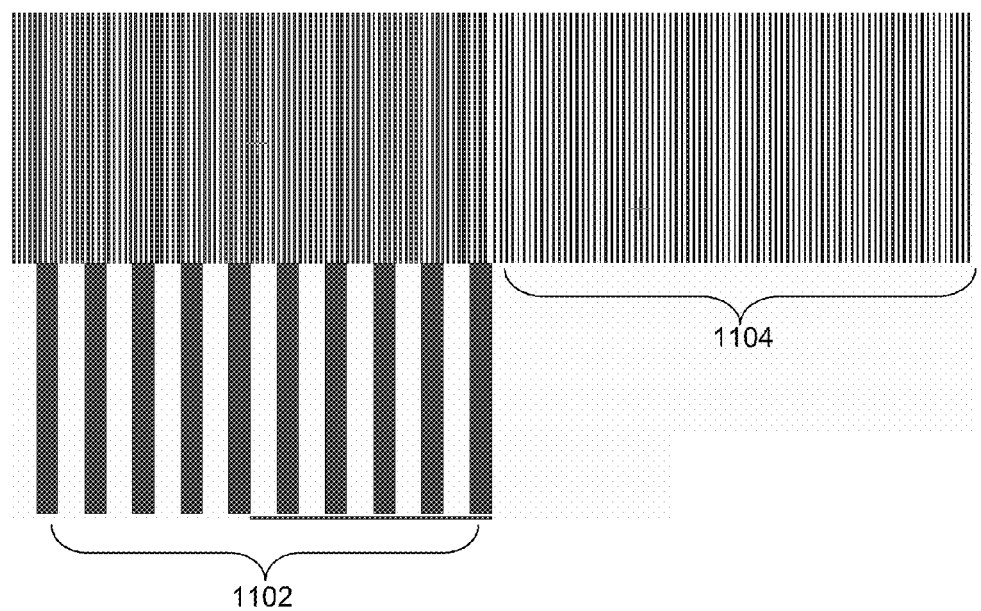
FIG. 11 is a top view diagrammatic representation of an overlay pattern in accordance with a fifth embodiment of the present invention.

FIG. 11 is a top view of first layer features 1102 and second layer features 1104 of a single quadrant of a Moire type target 1100 in accordance with an alternative embodiment of the present invention. In this example, features of second layer are only present within the inner portion of the target, and these second layer features are design related, while the process robust structures are omitted. In this example, the inner portion of the target has a Moire effect with low contrast.

Targets may also be designed for overlay measurement using an SEM. The overlay is measured on a specially designed target with the following built-in symmetry. The regions of interest (ROIs) used contain junctions between the structures/layers between which the overlay is to be measured. FIG. 8 is a top view of target that can be measured with an SEM in accordance with one embodiment of the present invention. As shown, these structures are arrays of thick inner and thin outer bars.

In this example, the structures in the regions-of-interest (ROIs) 1202 and 1204 are identical up to 180° rotation around the point called center of symmetry (COS). Overlay (or pattern placement errors) leads to separation between the COSs of inner and outer patterns. The overlay is defined as this misregistration between the COSs of inner and outer patterns. In general, the overlay is measured by locating the COSs of both inner and outer patterns.

Figure 12:
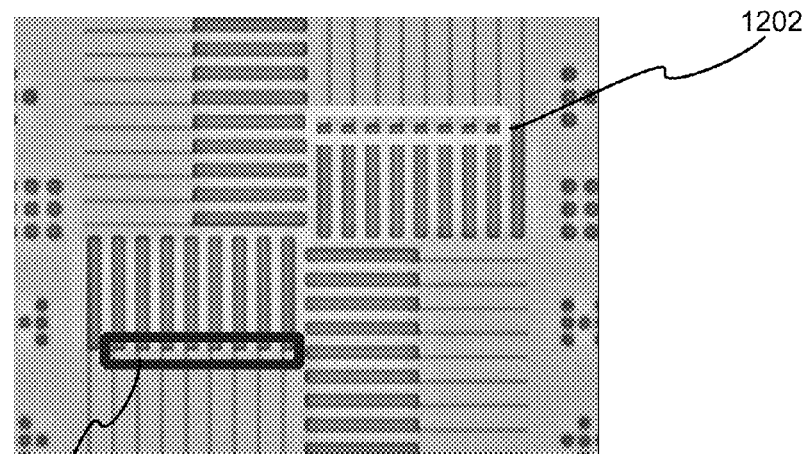
FIG. 12 is a top view photographic image of overlay patterns which are also imaged with a scanning electron microscope (SEM) in accordance with one aspect of the present invention.
Figure 13A:
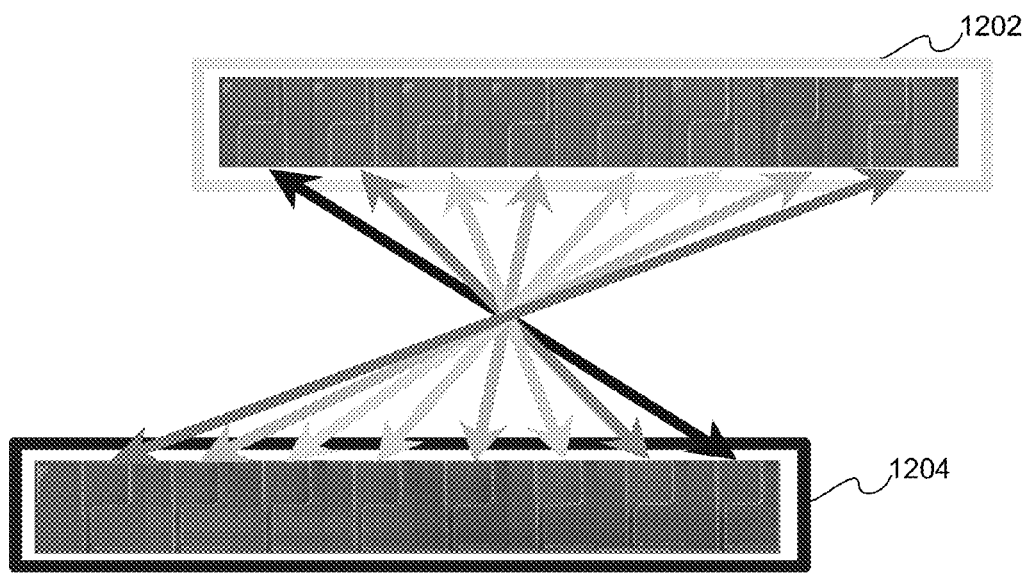
FIG. 13A is top view photographic images of symmetrical overlay pattern portions which are also imaged with a scanning electron microscope (SEM) in accordance with one aspect of the present invention.

In a first technique, overlay is based upon the edge detection. A series of the SEM images are grabbed and analyzed from the consecutive junctions of inner and outer lines (as shown in FIG. 13A). FIG. 13A illustrates the conjunctions of ROI 1202 and 1204 of the target of FIG. 12. Each SEM image in the ROI 1202 has a complementary (symmetric by design) image from the ROI 1204 as illustrated by the areas between the two ROIs.

Figure 13B:
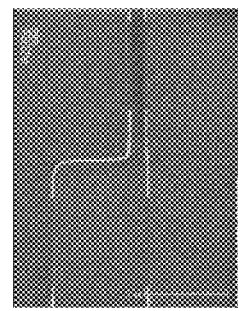
FIG. 13B is top view photographic image of a portion of an overlay pattern which is imaged with a scanning electron microscope (SEM) and wherein different edges are used to analyze the image portion in accordance with a specific implementation of the present invention.

In this method, each particular junction in the ROI ("SEM image") is analyzed to detect the edges (see FIG. 13B). Comparing between the edge from the ROI 1202 and its complementary couple from the ROI 1204 gives their COS position. Although absolute position of the COS cannot be measured, relative position of COSs for inner and outer edges can be detected, thus producing the overlay result.

Utilization of multiple edges from the whole ROI improves the statistics thus reducing random error contribution to the measurement. Separate treatment of physically different edges ("L" vs. "R", for example) enables monitoring overlay effect on chosen lines/edges. Measuring overlay at various wafer orientations (0, 90°, 180°) allows discrimination of the real overlay from the tool influence—tool induced shifts (TIS; 0° vs. 180°) or rotation induced shift (RIS; 0° vs. 90°).

Figure 14:
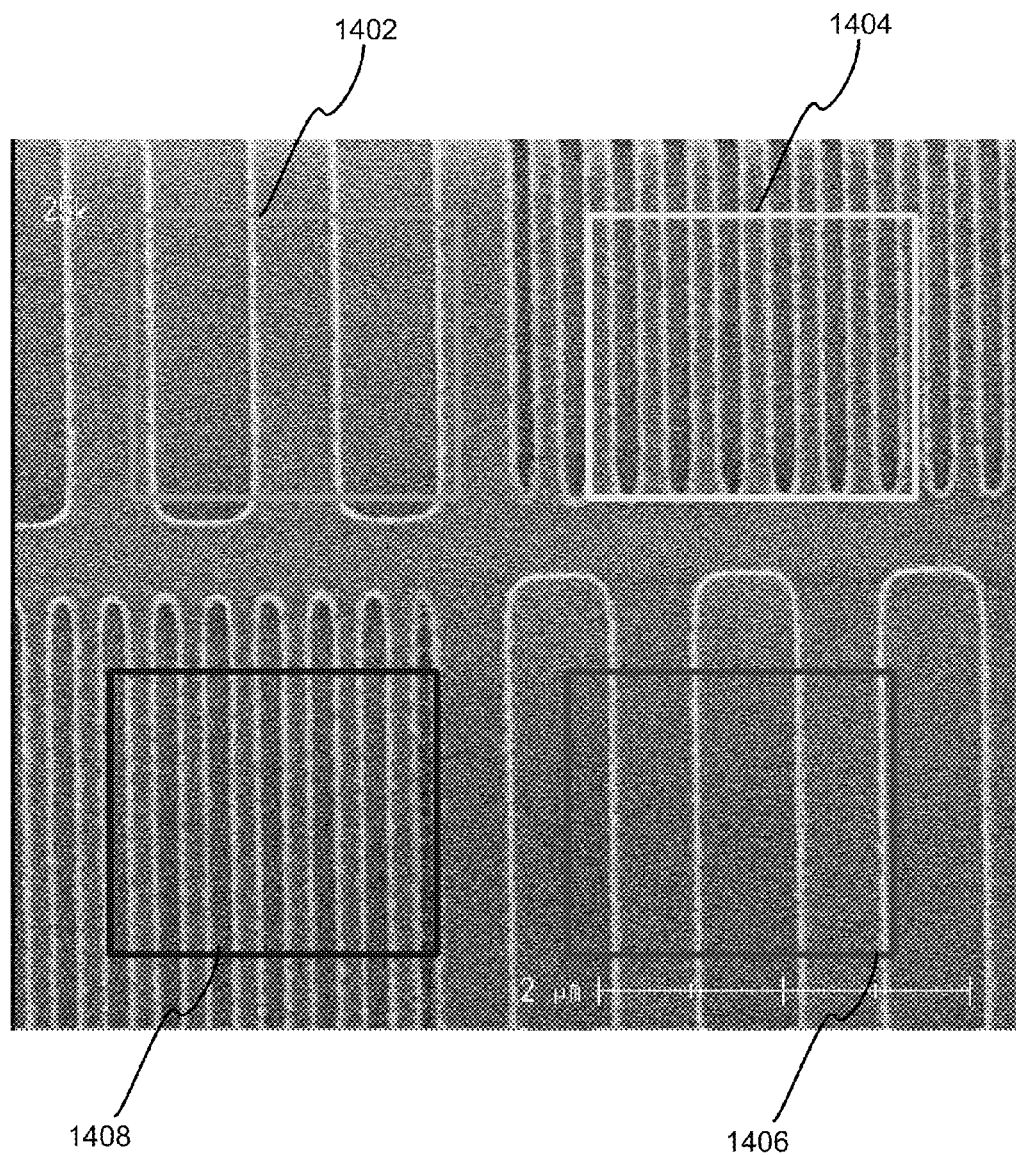
FIG. 14 is a top view photographic image of a portion of an SEM overlay pattern for correlation based overlay measurements in accordance with one embodiment of the present invention.

Another method is based upon correlation. This SEM overlay target also has both Layer1 and Layer2 structures that are to be symmetric with coinciding—by design—centers of symmetry. FIG. 14 is a top view photographic image of a portion of an SEM overlay pattern for correlation based overlay measurements in accordance with one embodiment of the present invention. The whole signals grabbed from the ROIs (boxes 1402, 1404, 1406, and 1408 of FIG. 14) are analyzed.

The signals in complementary ROIs (box 1404 vs. rotated box 1408; box 1406 vs. rotated box 1402) can be compared (either by two-dimensional correlation or by summing up in the vertical direction with subsequent one-dimensional correlation) to locate the COSs of Layer1 and Layer2 structures. The misregistration between the COSs may be defined as the overlay result.

Figure 15:
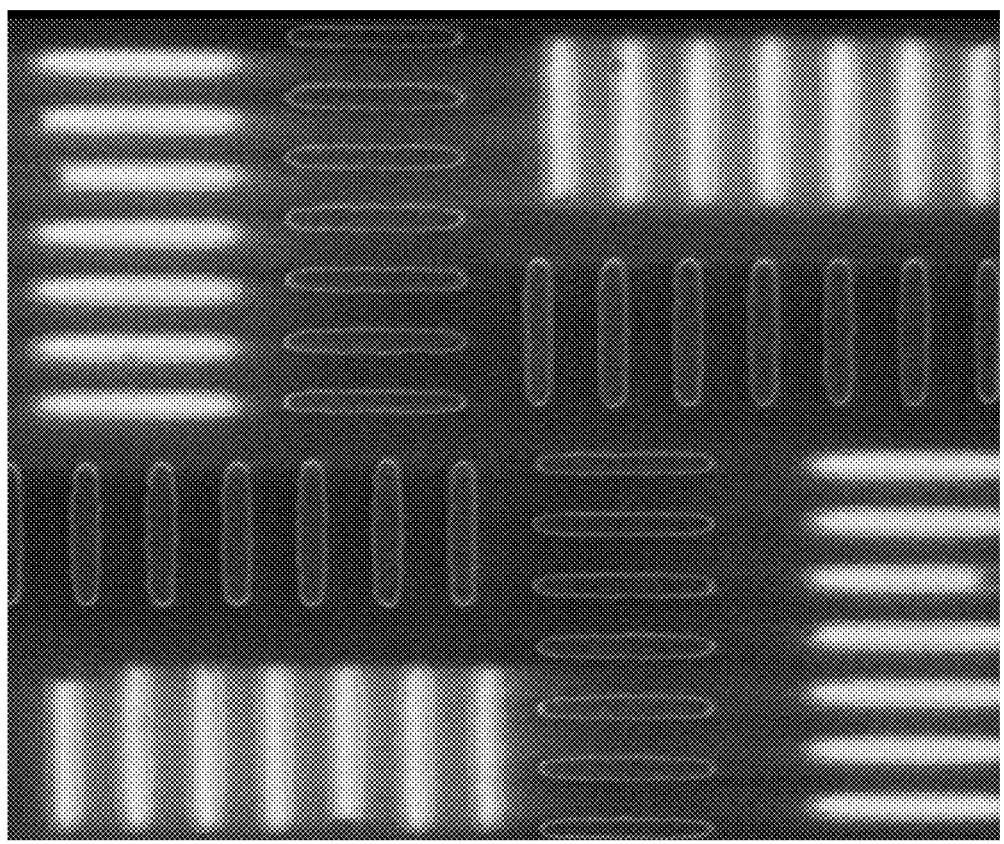
FIG. 15 is a photographic image of an SEM design relate, segmented type target in accordance with one embodiment of the present invention.

Another method for SEM overlay measurements is based upon the standard optical imaging-like overlay mark designs. In FIG. 15, a photographic image of an SEM design relate, segmented type target is shown. This mark is built of fine pitch gratings on both inner and outer layers. Similarly to standard (optical imaging) design-related, segmented mark, this mark is designed in a way that centers of symmetry (COSs) of inner and outer structures coincide. The overlay is measured as misregistration between these COSs. The algorithms for finding COSs can be similar to standard algorithms described in the above U.S. application Ser. No. 10/185,737. This enables automation of the SEM overlay measurements. In addition, an SEM design-related, segmented mark overlay measurement is less sensitive to image rotation appearing in the SEM. Also, 90° and 180° rotational symmetry allows easy TIS and RIS measurements and their (TIS and RIS) clear separation from the effects cause by imperfectness of the target itself.

Similarly to a SEM design-related, segmented mark, SEM Box-in-Box (BiB) marks can be designed and measured with the optical imaging-like technique (both algorithmic and automation).

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

What is claimed is:

1. A method of monitoring or adjusting a process for fabricating a product specimen, the method comprising:

providing a plurality of targets on a product specimen having a plurality of active devices, wherein at least some of the targets are distributed across a field of a lithography tool which was used to fabricate the product specimen and wherein the number and positions of the targets are selected such that a nonlinear dependence curve for a lithography tool and a characteristic of the targets can be determined as a function of field position across the field by measuring the characteristic of each of the targets that are distributed across the field, wherein the targets are distributed across the field by distributing the targets along a street that separates two rows or columns of dies of the field and/or integrating the targets within a plurality of dies that are distributed across the field;

measuring the characteristic of each of the targets which are distributed across the field;

determining a nonlinear dependence curve for the lithography tool as a function of field position across the field, wherein the nonlinear dependence curve is determined by fitting a nonlinear function to the targets' measured characteristics; and using the determined nonlinear dependence curve to monitor or adjust a process for fabricating the product specimen with the lithography tool.

2. A method as recited in claim 1, wherein the product specimen is a semiconductor wafer having a plurality of die.

3. A method as recited in claim 1, wherein the measured characteristic comprises overlay information.

4. A method as recited in claim 3, wherein using the nonlinear dependence curve includes using the nonlinear dependence curve to determine a disposition of a plurality of product specimens which are being fabricated together.

5. A method as recited in claim 4, wherein the targets include four corner targets placed at four corners of the field as well as the targets distributed across the field, the method further comprising measuring overlay on the four corner targets, wherein the nonlinear dependence curve is further based on the overlay of the four corner targets.

6. A method as recited in claim 5, further comprising determining a linear function of the overlay of the four corner targets as a function of field position and using the linear function as correctables for the lithography tool.

7. A method as recited in claim 3, wherein using the nonlinear dependence curve further comprises using only the linear terms of the nonlinear dependence curve as correctables for the lithography tool.

8. A method as recited in claim 7, wherein the targets include four corner targets placed at four corners of the field and targets distributed across the field, the method further comprising measuring overlay of the four corner targets, wherein the nonlinear dependence curve is further based on the overlay of the four corner targets.

9. A method as recited in claim 3, wherein using the nonlinear dependence curve includes using the nonlinear dependence curve as correctables for the lithography tool.

10. A method as recited in claim 9, wherein the targets include four corner targets placed at four corners of the field and targets distributed across the field, the method further comprising measuring overlay on the four corner targets, wherein the nonlinear dependence curve is further based on the overlay of the four corner targets.

11. A method as recited in claim 3, wherein using the nonlinear dependence curve includes using the nonlinear dependence curve to monitor the lithography tool.

12. A method as recited in claim 11, wherein the targets include four corner targets placed at four corners of the field and targets distributed across the field, the method further comprising measuring overlay on the four corner targets, wherein the nonlinear dependence curve is further based on the overlay of the four corner targets.

13. A method as recited in claim 12, further comprising determining a linear function based on the overlay of the four corner targets and using the linear function as correctables for the lithography tool.

14. A method as recited in claim 1, wherein the targets are distributed across the field by distributing the targets along a street that separates two rows or columns of dies of the field.

15. A method as recited in claim 1, wherein the targets are integrated within a plurality of dies that are distributed across the field.

16. A method of monitoring or adjusting a process for fabricating a product specimen, the method comprising:
providing a plurality of targets on a product specimen having a plurality of active devices, wherein a field of a lithography tool includes a first set of process robust targets formed in at least the four corners of the field and in streets in the field and wherein a second set of device representing targets are distributed across the field of the lithography tool by distributing the targets along a street that separates two rows or columns of dies of the field and/or integrating the targets within a plurality of dies that are distributed across the field, wherein the lithography tool was used to fabricate the product specimen and wherein the number and positions of the first and second sets of targets are selected such that a nonlinear dependence curve for a lithography tool and a characteristic of the targets can be determined as a function of field position across the field by measuring the characteristic of each of the targets;

measuring the characteristic of each of the targets which are distributed across the field;

determining a nonlinear dependence curve for the lithography tool as a function of field position across the field, wherein the nonlinear dependence curve is determined by fitting a nonlinear function to at least the second set of device representing targets' measured characteristics; and using the determined nonlinear dependence curve to monitor or adjust a process for fabricating the product specimen with the lithography tool.

17. A method as recited in claim 16, wherein the measured characteristic comprises overlay information.

18. A method as recited in claim 1, wherein the targets are distributed across a center of the field.

19. A method as recited in claim 1, wherein the number and positions of the targets are selected such that a minimum placement distance of the targets is selected so as to capture a known rate of process variation across the field in the determined nonlinear dependence curve.

20. A method as recited in claim 1, wherein the number and positions of the targets are selected such that a minimum placement distance of the targets is selected so as to capture a known rate of aberrations across the field of the lithography tool in the determined nonlinear dependence curve.

21. A method as recited in claim 1, wherein the number and positions of the targets are selected such that a minimum placement distance of the targets is selected so as to capture a known variation of lithography errors produced by the lithography tool in the determined nonlinear dependence curve.

22. A method as recited in claim 1, wherein the number and positions of the targets are selected such that a minimum placement distance is selected so as to capture a minimum variation spacing of process variations, lithography aberrations, and lithography errors in the determined nonlinear dependence curve.

23. A method as recited in claim 22, wherein the number of targets are selected to result in a measurement uncertainty equal to or greater than a required measurement uncertainty.

* * * * *